United States Patent
Yang et al.

(10) Patent No.: US 12,159,996 B2
(45) Date of Patent: Dec. 3, 2024

(54) POSITIVE ELECTRODE ACTIVE MATERIAL, POSITIVE ELECTRODE INCLUDING THE SAME, AND LITHIUM SECONDARY BATTERY EMPLOYING THE POSITIVE ELECTRODE

(71) Applicant: Samsung SDI Co., Ltd., Yongin-si (KR)

(72) Inventors: Mihwa Yang, Yongin-si (KR); Moonju Cho, Yongin-si (KR); Minjae Kim, Yongin-si (KR); Beomkwon Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 266 days.

(21) Appl. No.: 17/211,650

(22) Filed: Mar. 24, 2021

(65) Prior Publication Data
US 2021/0305561 A1    Sep. 30, 2021

(30) Foreign Application Priority Data

Mar. 25, 2020   (KR) .................. 10-2020-0036429
Mar. 24, 2021   (KR) .................. 10-2021-0037834

(51) Int. Cl.
*H01M 4/525*    (2010.01)
*H01M 4/505*    (2010.01)
(Continued)

(52) U.S. Cl.
CPC .......... *H01M 4/525* (2013.01); *H01M 4/505* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 6,811,925 B2 | 11/2004 | Yamato et al. |
| 7,214,449 B2 | 5/2007 | Sato et al. |

(Continued)

FOREIGN PATENT DOCUMENTS

| CN | 102 569 722 A | 7/2012 |
| CN | 103022499 A * | 4/2013 |

(Continued)

OTHER PUBLICATIONS

Wangda Li, Xiaoming Liu, Hugo Celio, Patrick Smith, Andrei Dolocan, Miaofang Chi, and Arumugam Manthiram. Mn versus Al in Layered Oxide Cathodes in Lithium-Ion Batteries: A Comprehensive Evaluation on Long-Term Cyclability, Adv. Energy Mater. 2018, 8, 1703154.*

(Continued)

*Primary Examiner* — Carlos Barcena
(74) *Attorney, Agent, or Firm* — Lewis Roca Rothgerber Christie LLP

(57) ABSTRACT

A lithium secondary battery includes a positive electrode including a positive electrode active material, a negative electrode, and an electrolyte located therebetween. The positive electrode active material includes a lithium cobalt-based active material and a lithium nickel cobalt-based active material, wherein the lithium cobalt-based active material is larger in size and amount than the lithium nickel cobalt-based active material, and the lithium nickel cobalt-based active material is a one-body positive electrode active material.

15 Claims, 6 Drawing Sheets

(51) Int. Cl.
*H01M 10/0525* (2010.01)
*H01M 4/02* (2006.01)

(56) References Cited

U.S. PATENT DOCUMENTS

| | | |
|---|---|---|
| 7,981,547 B2 | 7/2011 | Suhara et al. |
| 8,663,846 B2 | 3/2014 | Choi et al. |
| 8,709,301 B2 | 4/2014 | Wang et al. |
| 8,871,113 B2 | 10/2014 | Kim et al. |
| 8,900,753 B2 | 12/2014 | Konishi et al. |
| 8,962,195 B2 | 2/2015 | Shizuka et al. |
| 9,184,443 B2 | 11/2015 | Lee et al. |
| 9,406,928 B2 | 8/2016 | Kokado et al. |
| 9,406,931 B2 | 8/2016 | Song et al. |
| 9,564,628 B2 | 2/2017 | Kim et al. |
| 9,716,272 B2 | 7/2017 | Kawai et al. |
| 9,742,002 B2 | 8/2017 | Shimokita et al. |
| 9,761,865 B2 | 9/2017 | Kim et al. |
| 9,793,540 B2 | 10/2017 | Kawai |
| 9,985,282 B2 | 5/2018 | Hiratsuka et al. |
| 9,991,505 B2 | 6/2018 | Kokado et al. |
| 10,038,189 B2 | 7/2018 | Toya et al. |
| 10,038,190 B2 | 7/2018 | Toya et al. |
| 10,826,057 B2 | 11/2020 | Hong |
| 2014/0134491 A1 | 5/2014 | Sugimoto et al. |
| 2015/0104704 A1 | 4/2015 | Kim et al. |
| 2016/0093885 A1 | 3/2016 | Kamata et al. |
| 2016/0172673 A1 | 6/2016 | Toya et al. |
| 2016/0172674 A1 | 6/2016 | Oda et al. |
| 2016/0380263 A1 | 12/2016 | Nakayama et al. |
| 2017/0194626 A1 | 7/2017 | Yamamura et al. |
| 2017/0294645 A1 | 10/2017 | Shin et al. |
| 2017/0317339 A1 | 11/2017 | Shimokita et al. |
| 2017/0324091 A1 | 11/2017 | Hasegawa et al. |
| 2017/0324092 A1 | 11/2017 | Yoshida et al. |
| 2017/0352885 A1 | 12/2017 | Kondo et al. |
| 2018/0048015 A1 | 2/2018 | Lee et al. |
| 2018/0226646 A1 | 8/2018 | Furuichi et al. |
| 2018/0233739 A1 | 8/2018 | Park et al. |
| 2018/0254511 A1 | 9/2018 | Park et al. |
| 2018/0261835 A1 | 9/2018 | Ogata et al. |
| 2018/0261842 A1 | 9/2018 | Park et al. |
| 2018/0261873 A1 | 9/2018 | Yamaji et al. |
| 2018/0287135 A1 | 10/2018 | Shin et al. |
| 2018/0287143 A1 | 10/2018 | Ozaki et al. |
| 2018/0315997 A1 | 11/2018 | Kondo et al. |
| 2020/0212423 A1 | 7/2020 | Park et al. |
| 2021/0313573 A1 | 10/2021 | Park et al. |

FOREIGN PATENT DOCUMENTS

| | | |
|---|---|---|
| CN | 104488126 A | 4/2015 |
| CN | 107799763 A | 3/2018 |
| CN | 109326781 A | 2/2019 |
| CN | 110915035 A | 3/2020 |
| JP | 2000-149948 A | 5/2000 |
| JP | 2002-75367 A | 3/2002 |
| JP | 2003-68300 A | 3/2003 |
| JP | 2006-54159 A | 2/2006 |
| JP | 2006-054159 A | 2/2006 |
| JP | 2006-127955 A | 5/2006 |
| JP | 2009-151959 A | 7/2009 |
| JP | 2013-120676 A | 6/2013 |
| KR | 10-2004-0026378 A | 3/2004 |
| KR | 10-2005-0030899 A | 3/2005 |
| KR | 10-2006-0049435 A | 5/2006 |
| KR | 10-2006-0091486 A | 8/2006 |
| KR | 10-2010-0036929 A | 4/2010 |
| KR | 10-2011-0109879 A | 10/2011 |
| KR | 10-2013-0125236 A | 11/2013 |
| KR | 10-2014-0018137 A | 2/2014 |
| KR | 10-2014-0018628 A | 2/2014 |
| KR | 10-2016-0075196 A | 6/2016 |
| KR | 10-2017-0063408 | 6/2017 |
| KR | 10-2017-0063408 A | 6/2017 |
| KR | 10-1785262 B1 | 10/2017 |
| WO | WO 2012/176471 A1 | 12/2012 |
| WO | WO 2019/059647 A2 | 3/2019 |

OTHER PUBLICATIONS

European Patent Office Extended Search Report dated Nov. 8, 2021, issued in EP Application No. 21165061.9, 7 pages.
Office Action, EP Application No. 21165061.9, issue date Feb. 9, 2024, 5 pps.
CN Office Action; CN Patent Application No. 202110319065.2, issued on Feb. 2, 2024; 7 pps.

* cited by examiner

POSITIVE ELECTRODE ACTIVE MATERIAL, POSITIVE ELECTRODE INCLUDING THE SAME, AND LITHIUM SECONDARY BATTERY EMPLOYING THE POSITIVE ELECTRODE

CROSS-REFERENCE TO RELATED APPLICATION

This application claims priority to and the benefit of Korean Patent Application Nos. 10-2020-0036429, filed on Mar. 25, 2020, and 10-2021-0037834, filed on Mar. 24, 2021, in the Korean Intellectual Property Office, the entire content of each of which is incorporated herein by reference.

BACKGROUND

1. Field

One or more aspects of embodiments of the present disclosure relate to a positive electrode active material, a positive electrode including the same, and a lithium secondary battery employing the positive electrode.

2. Description of Related Art

In order to meet the trend toward compact, high-performance devices, it is important to manufacture lithium secondary batteries that are small, lightweight, and/or have high energy density. In addition, the stability of lithium secondary batteries under high-capacity, high-temperature, and/or high-voltage conditions has become an important factor for applications in electric vehicles and/or the like.

Various positive electrode active materials are currently under investigation to achieve a lithium secondary battery that is suitable for the purposes described.

A nickel-based active material and/or a cobalt-based active material may be utilized as a positive electrode active material. Because nickel-based active materials have a high intrinsic capacity but a relatively large average particle diameter and a hard, spherical shape, it may be difficult to achieve a suitable positive electrode mixture density when the nickel-based active material is utilized. In addition, a cobalt-based positive electrode active material is expensive, and reduced manufacturing costs are desired.

SUMMARY

One or more aspects of embodiments of the present disclosure are directed toward a positive electrode active material that can provide improved capacity characteristics by improving a mixture density of a positive electrode.

One or more aspects of embodiments of the present disclosure are directed toward a positive electrode including the positive electrode active material.

One or more aspects of embodiments of the present disclosure are directed toward a lithium secondary battery having improved cell performance by employing the positive electrode.

Additional aspects will be set forth in part in the description that follows and, in part, will be apparent from the description, or may be learned by practice of the presented embodiments of the disclosure.

One or more embodiments of the present disclosure provide a positive electrode active material including a lithium cobalt-based active material and a lithium nickel cobalt-based active material, wherein the lithium cobalt-based active material is larger in size and amount (e.g., is included in a larger amount) than the lithium nickel cobalt-based active material, and the lithium nickel cobalt-based active material is a one-body positive electrode active material.

One or more embodiments of the present disclosure provide a positive electrode including the positive electrode active material.

One or more embodiments of the present disclosure provide a lithium secondary battery including the positive electrode, a negative electrode and an electrolyte located therebetween.

BRIEF DESCRIPTION OF THE DRAWINGS

The above and other aspects, features, and advantages of selected embodiments of the disclosure will be more apparent from the following description taken in conjunction with the accompanying drawings, in which.

DETAILED DESCRIPTION

Figure 1:
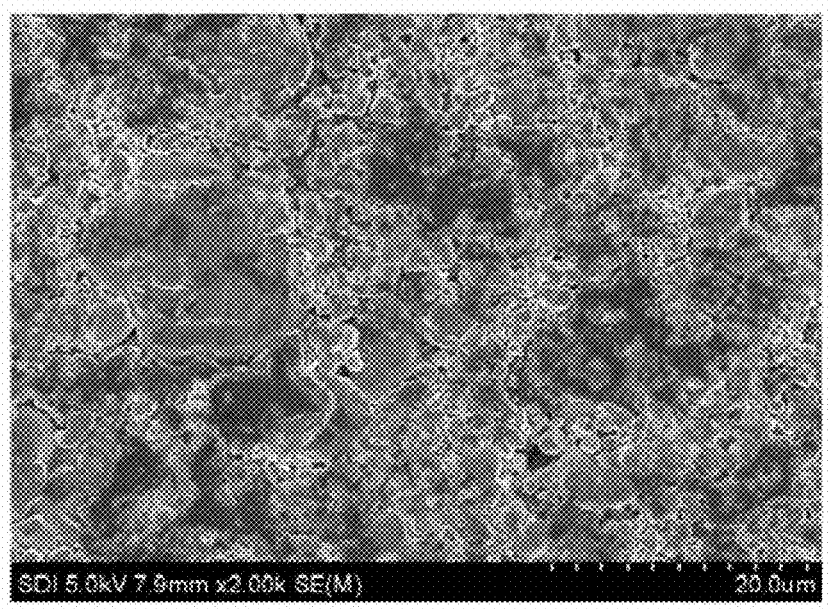
FIG. 1 is a scanning electron microscope (SEM) image showing a press-rolled positive electrode according to Example 1.

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are described with reference to the drawings merely to explain aspects of the present description. As utilized herein, the term "and/or" includes any and all combinations of one or more of the associated listed items. Expressions such as "at least one of," "one of," and "selected from," when preceding a list of elements, modify the entire list of elements and do not modify the individual elements of the list.

It will be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to" another element, there are no intervening elements present. As used herein, the term "and/or" includes any and all combinations of one or more of the associated listed items. Further, the use of "may" when describing embodiments of the present disclosure refers to "one or more embodiments of the present disclosure".

Hereinafter, a positive electrode active material according to one or more example embodiments, a preparing method thereof, a positive electrode including the same, and a lithium secondary battery including the positive electrode will be described in more detail.

Provided is a positive electrode active material including a lithium cobalt-based active material and a lithium nickel cobalt-based active material, wherein the lithium cobalt-based active material is larger in size and content (e.g., amount) than the lithium nickel cobalt-based active material (e.g., the size and content of the lithium cobalt-based active material are larger than those of the lithium nickel cobalt-based active material), and the lithium nickel cobalt-based active material is a one-body positive electrode active material (described in more detail below).

In the positive electrode active material, when the lithium cobalt-based active material has a smaller size than the lithium nickel cobalt-based active material, the active material particles may be severely cracked after press-rolling in preparing a positive electrode, and thus the positive electrode containing the positive electrode active material may have or demonstrate poor characteristics (e.g., in terms of mixture density and/or energy density). When the lithium cobalt-based active material has a smaller content than the lithium nickel cobalt-based active material, the capacity characteristics of a lithium secondary battery employing a positive electrode containing the positive electrode active material may be lowered. When the lithium nickel cobalt-based active material is not a one-body active material, the positive electrode active material may be poor in view of strength (e.g., may be relatively brittle or fragile), such that cracks may occur in the positive electrode active material during electrode pressing and gases may be generated, resulting in lowered high-temperature resistance (e.g., degraded high-temperature characteristics when the material is used in a battery).

In the present specification, the term "size" refers to an average particle diameter (D50) when the lithium cobalt-based active material and the lithium nickel cobalt-based active material have (e.g., are in the form of) spherical particles. In some embodiments, when the particles of the lithium cobalt-based active material and the lithium nickel cobalt-based active material are not spherical, the term "size" indicates a long-axis length.

The average particle diameter may be measured utilizing a particle size distribution (PSD) meter and/or through scanning electron microscopy (SEM). The long-axis length may be measured through SEM.

In the present specification, "D50" refers to a particle diameter corresponding to a volume of 50% with respect to a cumulative particle distribution ordered from smallest size to largest size, for example as analyzed by a particle size analyzer (HORIBA, LA-950 laser particle size analyzer).

When only a nickel-based active material is utilized as a positive electrode active material, the nickel-based active material may have a high intrinsic capacity and include hard and spherical particles. Thus, when an active material layer including the nickel-based active material on a current collector is formed, distances among (between) the active material particles may be relatively large, and thus the formed positive electrode may have a smaller capacity than expected. In some embodiments, because the nickel-based active material is very hard, it may be difficult to improve a volume density of an electrode plate even if the electrode plate is prepared by press-molding. Further, the nickel-based active material may have several problems associated with general nickel-based positive electrode active materials, for example, a low discharge capacity and compromised safety when driving at high voltages.

Accordingly, in order to solve the above-mentioned problems of nickel-based active materials, a positive electrode active material having improved positive electrode mixture density and electrode plate volume density may be achieved by utilizing a mixture of a lithium cobalt-based active material having a relatively large average particle diameter and a lithium nickel cobalt-based active material having a relatively small average particle diameter, such that the spaces in the positive electrode active material layer among (between) spherical particles of the lithium cobalt-based active material having a relatively large average particle diameter may be filled with (occupied by) particles of the lithium nickel cobalt-based active material having a relatively small average particle diameter.

The lithium cobalt-based active material may have, for example, a spherical shape.

When the lithium cobalt-based active material is utilized alone as a positive electrode active material, the positive electrode may have a high mixture density but may have increased manufacturing costs due to use of expensive lithium cobalt-based active material, and cracks may occur in the positive electrode active material after press-rolling in preparing the positive electrode. However, when the positive electrode active material according to an embodiment employs a lithium cobalt-based active material having a large particle diameter in combination with a lithium nickel cobalt-based active material having a small particle diameter, the lithium cobalt-based active material being utilized as a main component of the positive electrode active material, the positive electrode problems associated with using only a lithium cobalt-based active material may be solved, and thus a good or suitable positive electrode mixture density may be achieved and cracks occurring in the active material after press-rolling may be effectively suppressed (e.g., without little cracks and/or pinholes), thereby producing a positive electrode and a lithium secondary battery having improved capacity characteristics.

The lithium nickel cobalt-based active material includes one-body particles (e.g., the lithium nickel cobalt-based active material is a one-body active material).

In the present specification, the term "one-body particle" may refer to a particle that is produced by increasing the size of a primary particle, in contrast to a more general case of a nickel-based positive electrode active material, in which primary particles having an average particle diameter of 1 µm or less are collected to form secondary particles. The term "secondary particle type (or kind)", when used to describe an active material, thus refers to an active material having a morphology that includes or primarily includes secondary particles. The term "one-body particle" refers to a particle structure in which each particle is present in an independent phase without morphologically agglomerated particles (e.g., without being agglomerated). A particle structure that can be compared and contrasted with the one-body particle may include a structure in which small particles (primary particles) are physically and/or chemically agglomerated to form large particles (secondary particles). For example, a "one-body" particle may have a unitary or monolithic morphology, may include a relatively small number of adjacent crystals (e.g., fewer than the number that would normally be agglomerated in a secondary particle), or for example may be a single isolated crystal. A "one-body" active material may be an active material primarily composed of "one-body" particles. For example, more than 90% of the active material may be composed of "one-body" particles. In some embodiments, more than 95%, more than 99%, or 99 to 100% of the active material may be composed of "one-body" particles.

By utilizing the positive electrode active material having one-body particles, the stability of a positive electrode slurry and an electrode mixture density may be improved in preparing the positive electrode. In some embodiments, a lithium secondary battery utilizing such a positive electrode may have reduced gas generation at high voltages, improved reliability, and improved safety.

Because the lithium nickel cobalt-based active material includes one-body particles, as described, a migration (diffusion) path length (distance) required for lithium ions to reach a surface of the positive electrode active material may be extended or increased. Lithium ions that have moved to the surface of the positive electrode active material may react with moisture or $CO_2$ in the air to obtain $Li_2CO_3$, LiOH, etc., and when fewer lithium ions reach the surface, the formation of $Li_2CO_3$ and LiOH impurities on the positive electrode active material surface can be minimized or reduced. In some embodiments, problems that may arise due to the surface impurities (for example, battery capacity reduction, an increase in interfacial resistance due to inhibited lithium ion diffusion, gas generation due to decomposition of impurities, and battery swelling resulting from the gas generation) may be prevented or reduced. As a result, when the positive electrode active material is applied to a battery, the battery may have improved capacity characteristics, high-temperature stability, and charge-discharge characteristics.

An average particle diameter of the lithium cobalt-based active material may be in a range from 10 μm to 20 μm, and an average particle diameter of the lithium nickel cobalt-based active material may be in a range from 3 μm to 8 μm.

The lithium cobalt-based active material may include or have the form of one or more secondary particles including agglomerates of two or more primary particles, or may include or have the form of one-body particles. In some embodiments, the lithium cobalt-based active material may include or have the form of one-body particles.

When the lithium cobalt-based active material includes secondary particles, the "average particle diameter" of the lithium cobalt-based active material refers to an average particle diameter of the secondary particles. When the lithium cobalt-based active material includes one-body particles, the "average particle diameter" of the lithium cobalt-based active material refers to an average particle diameter of the one-body particles that are formed by increasing the size of the primary particles (e.g., a starting primary particle material). According to an embodiment, an "average particle diameter" of the lithium nickel cobalt-based active material refers to an average particle diameter of one-body particles that are formed by increasing sizes of primary particles (e.g., a starting primary particle material).

The average particle diameter of the lithium cobalt-based active material may be in a range from, for example, 11 μm to 18 μm, 12 μm to 17 μm, 13 μm to 17 μm, 13.5 μm to 17 μm, 14 μm to 16.5 μm, or 14 μm to 16 μm. The average particle diameter of the lithium nickel cobalt-based active material may be in a range from, for example, 3 μm to 8 μm, 3.5 μm to 7.5 μm, 4 μm to 7 μm, 4.5 μm to 6.5 μm, or 5 μm to 6 μm. When the average particle diameter of the lithium cobalt-based active material having a large particle diameter is in the ranges listed above, the positive electrode may have a good or suitable electrode mixture density without a decrease in high-rate characteristics. When the average particle diameter of the lithium nickel cobalt-based active material having a small particle diameter (one body particles) is in the ranges listed above, the positive electrode may have a good or suitable electrode mixture density without impacting the safety of a lithium secondary battery.

A mixing weight ratio of the lithium cobalt-based active material and the lithium nickel cobalt-based active material may be 6:4 to 8:2 (or 1.5:1 to 4:1), for example, 7:3 to 6:2 (or 2.3:1 to 3:1). According to an embodiment, the mixing weight ratio of the lithium cobalt-based active material and the lithium nickel cobalt-based active material may be 7:3. When the mixing weight ratio of the lithium cobalt-based active material and the lithium nickel cobalt-based active material is in the range listed above, a positive electrode having a good capacity characteristic per volume may be prepared without degraded swelling properties (e.g., due to gas generation under high-voltage and/or high-temperature conditions).

The positive electrode active material according to an embodiment can overcome a related art limitation with respect to capacity per volume (e.g., volumetric capacity), and can be used to thereby provide a cell having a high capacity while maintaining a good mixture density. According to an embodiment, the mixture density of the positive electrode may be 4.0 g/cc or greater, 4.1 g/cc or greater, 4.0 g/cc to 4.2 g/cc, or 4.15 g/cc to 4.2 g/cc.

A porosity of the positive electrode according to an embodiment may be 10.0% to 12.1%, 10.3% to 12%, or 10.5% to 11.5%. In the present specification, the porosity of the positive electrode refers to a proportional volume occupied by the pores, relative to a total volume of the positive electrode.

According to an embodiment, a compression ratio of the positive electrode may be 42.7% or less, 42.68% or less, 20% to 42.86%, 22% to 42.5%, 23% to 42%, 24% to 41%, or 25% to 40%. To obtain the compression ratio of the positive electrode, a coating thickness (d1) of the positive electrode is measured (e.g., prior to being press-rolled). Next, the positive electrode is press-rolled and a press-rolled thickness (d2) of the positive electrode is then measured.

The positive electrode is cut into a 30 mm×30 mm size, a thickness and weight thereof are measured to obtain a mixture density, and a positive electrode having the same loading level is press-rolled to then calculate a compression ratio of the positive electrode according to Equation 1:

Compression ratio (%)={(d1-current collector thickness)−(d2-current collector thickness)}/(d1-current collector thickness)     Equation 1

A specific surface area of the lithium cobalt-based active material may be 0.1 $m^2/g$ to 0.3 $m^2/g$, 0.15 $m^2/g$ to 0.25 $m^2/g$, 0.1 $m^2/g$ to 0.2 $m^2/g$, 0.15 $m^2/g$ to 0.18 $m^2/g$, or 0.160 $m^2/g$ to 0.165 $m^2/g$, and a specific surface area of the lithium nickel cobalt-based active material may be 0.4 $m^2/g$ to 0.8 $m^2/g$, 0.5 $m^2/g$ to 0.7 $m^2/g$, or 0.60 $m^2/g$ to 0.65 $m^2/g$. The specific surface area may be a BET specific surface area measured by a Brunauer-Emmett-Teller (BET) method.

The lithium cobalt-based active material may be a compound represented by Formula 1, a compound represented by Formula 2, or a combination thereof:

$Li_xCo_{1-y}M_yA_2$     Formula 1 wherein, in Formula 1, 0.9≤x≤1.2, 0≤y≤0.5, M is manganese (Mn), magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), silicon (Si), chromium (Cr), iron (Fe), vanadium (V), a rare earth element, or a combination thereof, and A is oxygen (O), fluorine (F), sulfur (S), phosphorus (P), or a combination thereof, and

$Li_xCo_{1-y}M_yO_{2-z}X_z$     Formula 2 wherein, in Formula 2, 0.9≤x≤1.2, 0≤y≤0.5, 0≤z≤0.5, M is Mn, Mg, Ca, Sr, Ba, Ti, Zr, Nb, Mo, W, Zn, Al, Si, Cr, Fe, V, a rare earth element, or a combination thereof, and X is F, S, P, or a combination thereof.

The lithium nickel cobalt-based active material of the positive electrode active material according to an embodiment may be a compound represented by Formula 3, a compound represented by Formula 4, or a combination thereof:

$$Li_xNi_{1-y}Co_yO_{2-z}X_z \quad \text{Formula 3}$$

wherein, in Formula 3, 0.9≤x≤1.2, 0<y≤0.5, 0≤z≤0.5, and X is F, S, P, or a combination thereof, and $$Li_xNi_{1-y-z}CO_yM_zO_{2-a}X_a \quad \text{Formula 4}$$

wherein, in Formula 4, 0.9≤x≤1.2, 0<y≤0.5, 0<1-y-z, 0≤z≤0.5, 0≤a<2,

M is Ni, Co, Mn, Mg, Ca, Sr, Ba, Ti, Zr, Nb, Mo, W, Zn, Al, Si, Cr, Fe, V, a rare earth element, or a combination thereof, and X is F, S, P, or a combination thereof.

In Formulae 3 and 4, x may be 1 to 1.05, 1 to 1.03, or 1 to 1.02, and y may be, for example, 0.05 to 0.2. In some embodiments, in Formula 4, M may be Al, and z may be, for example, 0.005 to 0.05.

The lithium cobalt-based compound may be, for example, a compound represented by Formula 5:

$$Li_xCO_aO_{2+a} \quad \text{Formula 5}$$

wherein, in Formula 5, 0.9≤x≤1.2, 0.98≤a≤1.00, and −0.1≤a≤0.1.

The lithium cobalt-based compound according to an embodiment may be, for example, $LiCoO_2$.

The lithium nickel cobalt-based active material according to an embodiment may be a compound represented by Formula 7 or a compound represented by Formula 8:

$$Li_xCO_aNi_bMn_cO_2 \quad \text{Formula 7}$$

wherein, in Formula 7, 0.9<x<1.2, 0<a<0.5, 0<b<1, 0<c<1, and a+b+c=1, and $$Li_xCO_aNi_bAl_cO_2 \quad \text{Formula 8}$$

wherein, in Formula 8, 0.9<x<1.2, 0<a<0.5, 0<b<1, 0<c<1, and a+b+c=1.

In Formulae 7 and 8, x may be 1.0 to 1.2 or 1.0 to 1.1, a may be 0.001 to 0.45, 0.01 to 0.4, 0.01 to 0.3, 0.01 to 0.2, 0.01 to 0.1, or 0.01 to 0.02, b may be 0.6 to 0.99, 0.7 to 0.98, or 0.75 to 0.95, and c may be 0.001 to 0.3, 0.001 to 0.2, 0.001 to 0.1, 0.001 to 0.05, or 0.001 to 0.01.

The lithium nickel cobalt-based active material may be or include, for example, $LiNi_{0.9}Co_{0.09}Al_{0.01}O_2$, $LiNi_{0.9}Co_{0.09}Mn_{0.01}O_2$, $Li_{1.05}Ni_{0.9}Co_{0.09}Al_{0.01}O_2$, $Li_{1.05}Ni_{0.9}Co_{0.09}Mn_{0.01}O_2$, $Li_{1.05}Ni_{0.5}C_{0.2}Mn_{0.3}O_2$, $Li_{1.1}Ni_{0.5}Co_{0.2}Mn_{0.3}O_2$, $Li_{1.05}Ni_{0.6}Co_{0.2}Mn_{0.2}O_2$, and/or $Li_{1.1}Ni_{0.6}Co_{0.2}Mn_{0.2}O_2$.

According to an embodiment, when a lithium secondary battery utilizing the lithium nickel cobalt-based active material is implemented by adjusting the size of the one-body lithium nickel cobalt-based active material, the lithium secondary battery may have improved low temperature characteristics and/or rate characteristics, and an amount of gas generated at high voltages may be reduced, thereby ensuring reliability and/or safety of the battery.

The lithium nickel cobalt-based active material according to an embodiment may achieve a reduced specific surface area by adjusting the sizes of the primary and secondary particles of the positive electrode active material, in turn by adjusting a mixing mole ratio of transition metals and lithium from a lithium nickel cobalt-based active material precursor and lithium precursor, respectively, and controlling the heat treatment conditions (i.e., temperature, atmosphere, and time) during preparation of the positive electrode active material, such that surface side reaction(s) between residual lithium and an electrolytic solution may be suppressed or reduced by removing as much as the residual lithium as possible during preparation of the positive electrode active material. Further, a positive electrode active material having improved crystallinity and/or stability at high voltages can be obtained by controlling the preparing process.

When the lithium cobalt-based active material is a one-body active material, the above contents for the one-body lithium nickel cobalt-based active material may be applied in substantially the same manner.

In the lithium nickel cobalt-based active material, an amount of LiOH within the residual lithium may be in a range from 0.01 wt % to 0.06 wt % based on the weight of the lithium nickel cobalt-based active material, and an amount of $Li_2CO_3$ may be in a range from 0.05 wt % to 0.1 wt % based on the weight of the lithium nickel cobalt-based active material. The amounts of LiOH and $Li_2CO_3$ may be measured by utilizing a titration method.

In the lithium nickel cobalt-based active material, an amount of lithium carbonate, as measured by GC-MS analysis, may be 0.01 wt % to 0.05 wt %.

As described above, when the amount of residual lithium is small, gas generation at high voltages and/or high temperatures may be suppressed or reduced by preventing or reducing side reaction(s) between the residual lithium and an electrolytic solution, and thus the positive electrode active material may have increased safety. When an amount of LiOH (e.g., within the residual lithium) is reduced during preparation of a positive electrode slurry, a pH of the slurry is reduced and the positive electrode slurry is more stable, enabling substantially uniform coating of an electrode plate. Such reduction in the amount of LiOH may enhance stability of the slurry during preparation for coating a positive electrode plate.

When analyzed by differential scanning calorimetry, the positive electrode active material may have an onset point temperature of 250° C. to 270° C., which is higher than that of commercially available NCM, and a reduced instantaneous caloric value of a main peak thereof. When the positive electrode active material demonstrates such characteristics, a lithium ion secondary battery utilizing the positive electrode active material may have good high-temperature stability.

By utilizing the positive electrode active material, side reaction(s) between the positive electrode active material and an electrolytic solution may be suppressed or reduced, and the thermal and/or structural stability of the positive electrode active material may be improved, thereby improving the stability and/or charge-discharge characteristics of a lithium secondary battery including the positive electrode active material.

A method of preparing the one-body lithium nickel cobalt-based active material will now be described in more detail.

The method includes: performing a primary heat treatment on a lithium nickel cobalt-based active material precursor at a temperature in a range of 300° C. to 800° C., for example, 320° C. to 780° C., 350° C. to 750° C., 400° C. to 700° C., or 400° C. to 600° C., mixing a resultant product of the primary heat treatment and a lithium precursor to have a transition metal to lithium ratio of 1:1.05 or greater, and performing a secondary heat treatment on a resultant mixture at a temperature of 900° C. to 1200° C., 920° C. to 1150° C., 930° C. to 1130° C., 950° C. to 1100° C., 1000° C. to 1100° C., 1000° C. to 1050° C., 1010° C. to 1050° C., or 1020° C. to 1045° C.

As described above, lithium in the lithium precursor is excessively utilized (e.g., a molar excess of lithium is utilized) with respect to the transition metals in the lithium nickel cobalt-based active material precursor. The mixing mole ratio of the transition metals in the lithium nickel cobalt-based active material precursor to the lithium in the lithium precursor may be, for example, 1:1.05 to 1:1.1, or 1:1.05 to 1:1.08.

The primary heat treatment and the secondary heat treatment may be performed under an oxidative gas atmosphere.

The term "oxidative gas atmosphere" refers to a gas atmosphere including air or oxygen. In the gas atmosphere including oxygen, the amount of oxygen may be 20% to 40% by volume.

The primary heat treatment may be performed in the oxidative gas atmosphere for about 1 hour to about 5 hours, and the secondary heat treatment may be performed in the oxidative gas atmosphere for about 5 hours to about 10 hours.

When the primary heat treatment conditions are within the above-described ranges, a lithium nickel cobalt-based active material having a substantially uniform particle size may be produced. When the secondary heat treatment conditions are within the above-described ranges, a positive electrode active material having good or suitable performance may be obtained without problems including, for example, rapid drops in electrochemical properties (such as capacity or efficiency) due to excessive particle growth, decreased crystallinity due to insufficient particle growth, and an increased amount of residual surface lithium on the positive electrode active material due to a reduction in the amount of Li entering the inside of the structure or scattering therein (e.g., the amount of Li diffusion into and within the active material particles).

A mixing mole ratio of the transition metals in the lithium nickel cobalt-based active material precursor to the lithium in the lithium precursor may be controlled or selected to be 1:1.05 or greater, for example, 1:1.05 to 1:1.1, or 1:1.05 to 1:1.08. When the mixing mole ratio of the transition metals with respect to lithium is lower than the above range, deficiency of required lithium occurs at the same temperature, making it difficult to achieve suitable cation mixing, decreased crystallinity, and/or particle growth. As referred to herein, the transition metals in the lithium nickel cobalt-based active material precursor are defined as the sum of all the metals contained in the lithium nickel cobalt-based active material, except for lithium (e.g., all metals aside from lithium (Li) in the lithium nickel cobalt-based active material are included in the term "transition metals" in this context). For example, in a lithium nickel cobalt aluminum oxide (NCA) compound, in this context "transition metals" may refer to the nickel, cobalt, and aluminum.

The lithium nickel cobalt-based active material precursor may be prepared by co-precipitating a nickel precursor and other transition metal precursors. For example, the lithium nickel cobalt-based active material precursor may be a hydroxide (e.g., a co-precipitated hydroxide) containing nickel, cobalt and other metals.

For example, the lithium nickel cobalt-based active material precursor may be prepared by mixing a nickel precursor, a cobalt precursor and a manganese precursor with (e.g., in) a first solvent.

Any material that is available in the art may be utilized as the nickel precursor, the cobalt precursor, or the manganese precursor.

For example, nickel sulfate, nickel chloride, and/or nickel nitrate may be utilized as the nickel precursor.

For example, cobalt sulfate, cobalt chloride, and/or cobalt nitrate may be utilized as the cobalt precursor, and manganese sulfate, manganese chloride, and/or manganese nitrate may be utilized as the manganese precursor.

The amounts of the nickel precursor, the cobalt precursor, and the manganese precursor may be stoichiometrically controlled or selected to obtain a desired or suitable lithium nickel cobalt-based active material precursor.

Non-limiting examples of the first solvent may include water, ethanol, propanol, and/or butanol. In some embodiments, an amount of the first solvent may be in a range of 100 parts to 2,000 parts by weight, on a basis of 100 parts by weight of a total weight of the nickel precursor, the cobalt precursor, and the manganese precursor.

When the lithium nickel cobalt-based active material precursor and the lithium precursor are utilized in combination, a second solvent may be utilized. Like the first solvent, non-limiting examples of the second solvent may include water, ethanol, propanol, and/or butanol, and an amount of the second solvent may be in a range of 100 parts to 2,000 parts by weight, on a basis of 100 parts by weight of the lithium precursor.

A complexing agent and a pH controlling agent may be added and mixed to the mixture containing the lithium nickel cobalt-based active material precursor and the lithium precursor.

The lithium nickel cobalt-based active material precursor may be, for example, a compound represented by Formula 3-1:

$$Ni_{1-y-z}Co_yM_z(OH)_2 \qquad \text{Formula 3-1}$$

wherein, in Formula 3-1, $0<y\leq0.5$, $0<1-y-z$, $0\leq z\leq0.5$, and M is Mn, Mg, Ca, Sr, Ba, Ti, Zr, Nb, Mo, W, Zn, Al, Si, Cr, Fe, V, a rare earth element, or a combination thereof.

The lithium precursor may include one or more selected from lithium hydroxide, lithium carbonate, lithium sulfate, lithium nitrate, and lithium fluoride.

A non-limiting example of the complexing agent may include ammonia water a≤a≤source of ammonium ions, and a non-limiting example of the pH controlling agent may be or include a sodium hydroxide solution.

A pH of the resultant product may be controlled or selected to be in a range of about 11 to about 13 by adjusting the amount of the pH controlling agent.

When a precipitate is obtained from the resultant product, and the precipitate is washed by utilizing pure water and then subjected to a secondary heat treatment, a lithium nickel cobalt-based active material may be obtained.

In the preparing method, the mixing may be performed by utilizing a wet process or a dry process.

The one-body lithium cobalt-based active material may be prepared in substantially the same manner as in the method for preparing the one-body lithium nickel cobalt-based active material, except that, instead of the lithium nickel cobalt-based active material precursor, a lithium cobalt-based active material precursor is utilized.

The lithium cobalt-based active material precursor may be, for example, a compound represented by Formula 6:

$$Co_{1-y}M_y(OH)_2 \qquad \text{Formula 6}$$

wherein, in Formula 6, $0 \leq y \leq 0.5$, and M is Mn, Mg, Ca, Sr, Ba, Ti, Zr, Nb, Mo, W, Zn, Al, Si, Cr, Fe, V, a rare earth element, or a combination thereof.

The lithium cobalt-based active material precursor according to an embodiment may be prepared in substantially the same manner as in the method for preparing the lithium nickel cobalt-based active material precursor, except that a nickel precursor is not utilized (e.g., is not included as a reactant).

A positive electrode according to another embodiment may include the positive electrode active material.

The positive electrode includes: a current collector; and the positive electrode active material on the current collector.

The positive electrode may be prepared by molding a positive electrode active material composition including, for example, the positive electrode active material, a binder, etc. into a set or predetermined shape, or by coating the positive electrode active material composition on a current collector made of an aluminum foil, etc.

For example, the positive electrode active material composition may be prepared by mixing the positive electrode active material, a conducting agent, a binder, and a solvent. In some embodiments, a positive electrode plate may be prepared by directly coating the positive electrode active material composition on a metal current collector. In another embodiment, a positive electrode plate may be prepared by casting the positive electrode active material composition on a separate support, and then laminating a film exfoliated from the support onto the metal current collector. The positive electrode plate may be formed in any suitable shape or form.

The positive electrode may further include any suitable positive electrode active material in the art.

One or more selected from the group consisting of, but not limited to, a lithium cobalt oxide, a lithium nickel cobalt oxide, a lithium nickel cobalt manganese oxide, a lithium nickel cobalt aluminum oxide, a lithium iron phosphate, and a lithium manganate, may be utilized as a positive electrode active material (e.g., an additional positive electrode active material), and any positive electrode active material that is available in the art may be additionally utilized.

For example, the additional positive electrode active material may be a compound represented by one of the following formulas: $Li_aA_{1-b}B'_bD_2$ (where $0.90 \leq a \leq 1.8$, and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $LiaNi_{1-b-c}Co_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $O \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $\leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $\leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $\leq b \leq 0.5$, $0 \leq c \leq 0.05$, and $0 < \alpha < 2$); $Li_aNi_bE_cG'_dO_2$ (where $0.90 \leq a \leq 1.8$, $O \leq b \leq 0.9$, $0 \leq c \leq 0.5$, and $0.001 \leq d \leq 0.1$); $Li_aNi_bCo_cMn_dG'_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG'_bO_2$ (where $0.90 \leq a \leq 1.8$ and $0.001 \leq b \leq 0.1$); $Li_aCoG'_bO_2$ (where $0.90 \leq a \leq 1.8$ and $0.001 \leq b \leq 0.1$); $Li_aMn_2G'_bO_2$ (where $0.90 \leq a \leq 1.8$ and $0.001 \leq b \leq 0.1$); $LiaMn_2G'_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulas: A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G' is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

A compound (e.g., positive electrode active material) having a coating layer on (e.g., added on) the surface thereof, or a mixture of the positive electrode active material and the compound having the coating layer added thereto may also be utilized. The coating layer may include a coating element compound, such as an oxide compound, a hydroxide compound, an oxyhydroxide compound, an oxycarbonate compound, and/or a hydroxy carbonate compound of the coating element. The coating element compound may be amorphous or crystalline. Non-limiting examples of the coating element included in the coating layer may include Mg, Al, Co, K, sodium (Na), Ca, Si, Ti, V, tin (Sn), germanium (Ge), gallium (Ga), boron (B), arsenic (As), Zr, and/or one or more mixtures thereof. Any suitable coating method may be utilized as a coating layer forming process, as long as the method does not adversely affect the physical properties of the cathode active material, and details of such suitable coating methods (for example, spray coating and/or dipping) will be understood by those skilled in the art.

Non-limiting examples of the positive electrode active material may include $LiNiO_2$, $LiCoO_2$, $LiMn_xO_{2x}(x=1, 2)$, $LiNi_{1-x}Mn_xO_2(0<x<1)$, $LiNi_{1-x-y}Co_xMn_yO_2$ ($0=x=0.5$, $0=y=0.5$), $LiFeO_2$, $V_2O_5$, $TiS_2$, and/or $MoS_2$.

The conducting agent may include but is not limited to, for example, carbon black and/or graphite particulate, and any conducting material that is available in the art may be utilized. Non-limiting examples of the conducting agent may include: graphite (such as natural graphite and/or artificial graphite); a carbonaceous material (such as carbon black, acetylene black, Ketjen black, channel black, furnace black, lamp black and/or thermal black); conductive fibers (such as carbon fiber and/or metal fiber); carbon fluoride powder; metal powders (such as aluminum powder, and/or nickel powder); conductive whiskers (such as zinc oxide and/or potassium titanate); a conductive metal oxide (such as titanium oxide); and/or any other conducting material (such as a polyphenylene derivative).

The binder may includebut is not limited to, for example, a vinylidene fluoride/hexafluoropropylene copolymer, polyvinylidene fluoride (PVDF), polyacrylonitrile, polymethylmethacrylate, polytetrafluoroethylene, a combination thereof, and/or styrene butadiene rubber polymer, and any binder that is available in the art may be utilized as the binder.

The solvent may includebut is not limited to, for example, N-methylpyrrolidone, acetone, and/or water, and any solvent that is available in the art may be utilized as the solvent.

The amounts of the positive electrode active material, the conducting agent, the binder, and the solvent may each be in the ranges generally utilized in the manufacture of lithium secondary batteries in the related art. One or more of the conducting agent, the binder, and the solvent may be omitted depending on the intended use and structure of the lithium secondary battery.

A "true density" of the positive electrode according to an embodiment may refer to an intrinsic density of a pore-free electrode active material (e.g., the density of the positive electrode active material when pores are omitted). The true density of the positive electrode may be 4.76 g/cc to 5.10 g/cc, 8 g/cc to 5.05 g/cc, or 4.9 g/cc to 5.0 g/cc.

A lithium secondary battery according to another embodiment may include a positive electrode including the positive electrode active material, a negative electrode, and an electrolyte positioned therebetween. The lithium secondary battery may be manufactured in the following manner.

First, a positive electrode is prepared according to the above-described positive electrode preparing method.

Next, a negative electrode active material, a conducting agent, a binder, and a solvent may be mixed to prepare a negative electrode active material composition. The negative electrode active material composition may be directly coated on a metal current collector and dried to prepare a negative electrode plate. In another embodiment, the negative electrode active material composition may be cast on a separate support, and a film exfoliated from the support may then be laminated onto the metal current collector to prepare a negative electrode plate.

Any suitable negative electrode active material that is generally available in the art may be utilized as the negative electrode active material without limitation, and non-limiting examples of the negative electrode active material may include lithium metal, a metal that is alloyable with lithium, a transition metal oxide, a transition metal sulfide, a material that is capable of doping or de-doping lithium, a material that is capable of reversibly intercalating and deintercalating lithium ions, and/or a conductive polymer.

The transition metal oxide may be or include, for example, a tungsten oxide, a molybdenum oxide, a titanium oxide, a lithium titanium oxide, a vanadium oxide, or a lithium vanadium oxide. Non-limiting examples of the negative electrode active material may include: a Group 1 metal compound (such as CuO, $Cu_2O$, $Ag_2O$, CuS, and/or $CuSO_4$); a Group 4 metal compound (such as $TiS_2$ and/or SnO); a Group 5 metal compound (such as $V_2O_5$, $V_6O_{12}$, $VO_x$ (0<x<6), $Nb_2O_5$, $Bi_2O_3$, and/or $Sb_2O_3$); a Group 6 metal compound (such as $CrO_3$, $Cr_2O_3$, $MoO_3$, $MoS_2$, $WO_3$, and/or $SeO_2$); a Group 7 metal compound (such as $MnO_2$ and/or $Mn_2O_3$); a Group 8 metal compound (such as $Fe_2O_3$, FeO, $Fe_3O_4$, $Ni_2O_3$, NiO, $C_{003}$, and/or CoO); and/or a metal compound represented by the general formula $Li_xMN_yX_2$ (where M and N are each a Group 1 to 8 metal, X is oxygen or sulfur, $0.1 \leq x \leq 2$, and $0 \leq y \leq 1$), for example, lithium titanate represented by $Li_yTiO_2$ ($0 \leq y \leq 1$), $Li_{4+y}Ti_5O_{12}$ ($0 \leq y \leq 1$), and/or $Li_{4+y}Ti_{11}O_{20}$ ($0 \leq y \leq 1$).

Non-limiting examples of the material that is capable of doping or de-doping lithium may include Si, SiOx ($0<x \leq 2$), a Si—Y' alloy (where Y' may be an alkali metal, an alkali earth metal, a Group 13 element, a Group 14 element excluding Si, a Group 15 element, a Group 16 element, a transition metal element, a rare earth element, or a combination thereof), Sn, $SnO_2$, a Sn—Y' alloy (where Y' may be an alkali metal, an alkali earth metal, a Group 13 element, a Group 14 element excluding Sn, a Group 15 element, a Group 16 element, a transition metal element, a rare earth element, or a combination thereof), or a mixture of at least one thereof and $SiO_2$. The element Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof.

The material that is capable of reversibly intercalating and deintercalating lithium ions may be a carbonaceous material, and any carbonaceous negative electrode active material that is generally utilized in the manufacturing of a lithium secondary battery may be utilized. The carbonaceous material may be, for example, crystalline carbon, amorphous carbon, or a mixture thereof. Non-limiting examples of the carbonaceous material may include natural graphite having a non-shaped (e.g., having no particular shape), plate, flake, spherical, and/or fibrous form, and/or artificial graphite, and non-limiting examples of the amorphous carbon may include soft carbons (carbons sintered at low temperatures), hard carbons, meso-phase pitch carbonization products, and/or calcined cokes.

Non-limiting examples of the conductive polymer may include a disulfide polymer, polypyrrole, polyaniline, polyparaphenylene, polyacetylene, and/or a polyacenic material.

The same conducting agent, binder, and solvent as in the above-described positive electrode active material composition may be utilized in a negative electrode active material composition. In some cases, a plasticizer may be additionally added to the positive electrode active material composition and/or the negative electrode active material composition to enable the formation of pores in electrode plates.

The amounts of the negative electrode active material, the conducting agent, the binder, and the solvent may be the same as utilized in the manufacture of lithium secondary batteries in the art. One or more of the conducting agent, the binder, and the solvent may be omitted depending on the intended use and structure of the lithium secondary battery.

Next, a separator to be inserted between the positive electrode and the negative electrode is prepared. Any suitable separator that is commonly utilized in the manufacturing of a lithium secondary battery may be utilized as the separator. The separator may have low resistance to migration of ions (e.g., lithium diffusion) in an electrolyte, and may have a good or suitable electrolyte-retaining ability. The separator may be selected from the group consisting of, for example, glass fiber, polyester, Teflon, polyethylene, polypropylene, polytetrafluoroethylene (PTFE), and a combination thereof, and may be in the form of a non-woven fabric or a woven fabric. For example, a windable separator, (such as polyethylene and/or polypropylene), may be utilized for a lithium ion battery, and a separator highly capable of being impregnated with an organic electrolytic solution may be utilized for a lithium ion polymer battery. For example, the separator may be manufactured according to the following method.

A polymer resin, a filler, and a solvent are mixed to prepare a separator composition. The separator may be formed by directly coating the separator composition on an electrode and drying the composition. In some embodiments, the separator may also be formed by casting the separator composition on a support and then drying the composition, followed by laminating a separator film exfoliated from the support onto the electrode.

The polymer resin utilized in preparing the separator is not particularly limited, and any material that is utilized as a binding material of an electrode plate may be utilized. Non-limiting examples of the polymer resin may include a vinylidene fluoride/hexafluoropropylene copolymer, polyvinylidene fluoride (PVDF), polyacrylonitrile, polymethyl methacrylate, and/or one or more mixtures thereof.

Next, an electrolyte is prepared.

The electrolyte may be, for example, an organic electrolytic solution. The organic electrolytic solution may be prepared by dissolving a lithium salt in an organic solvent.

Any organic solvent that is available in the art may be utilized as the organic solvent. The organic solvent may include, for example, propylene carbonate, ethylene carbonate, fluoroethylene carbonate, butylene carbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofuran, 2-methyltetrahydrofuran, γ-butyrolactone, dioxorane, 4-methyldioxorane, N,N-dimethylformamide, dimethylacetamide, dimethylsulfoxide, dioxane, 1,2-dimethoxyethane, sulforane, dichloroethane, chlorobenzene, nitrobenzene, diethyleneglycol, dimethylether, and/or one or more mixtures thereof.

As the lithium salt, any lithium salt that is available in the art may be utilized. The lithium salt may include, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(CyF_{2y+1}SO_2)$ (with the proviso that x and y are each a natural number), LiCl, LiI, and/or one or more mixtures thereof.

In some embodiments, the electrolyte may be a solid electrolyte (such as an organic solid electrolyte and/or an inorganic solid electrolyte). When a solid electrolyte is utilized, the solid electrolyte may also function a separator.

Non-limiting examples of the organic solid electrolyte may include polyethylene derivatives, polyethylene oxide derivatives, polypropylene oxide derivatives, phosphoric acid ester polymers, poly alginate lysine, polyester sulfide, polyvinyl alcohols, polyvinylidene fluoride, and/or polymers containing ionic dissociation groups.

Non-limiting examples of the inorganic solid electrolyte may include, but are not limited to, boron oxides and/or lithium oxynitrides, and any inorganic solid electrolyte that can be utilized a solid electrolyte may be utilized. The solid electrolyte may be formed on the negative electrode by, for example, sputtering. Non-limiting examples of the inorganic solid electrolyte may include $Li_3N$, LiI, $Li_5N_{12}$, $Li_3N$—LiI—LiOH, $Li_2SiS_3$, $Li_4SiO_4$, $Li_4SiO_4$—LiI—LiOH, and/or $Li_3PO_4$—$Li_2S$—$SiS_2$.

Figure 7:
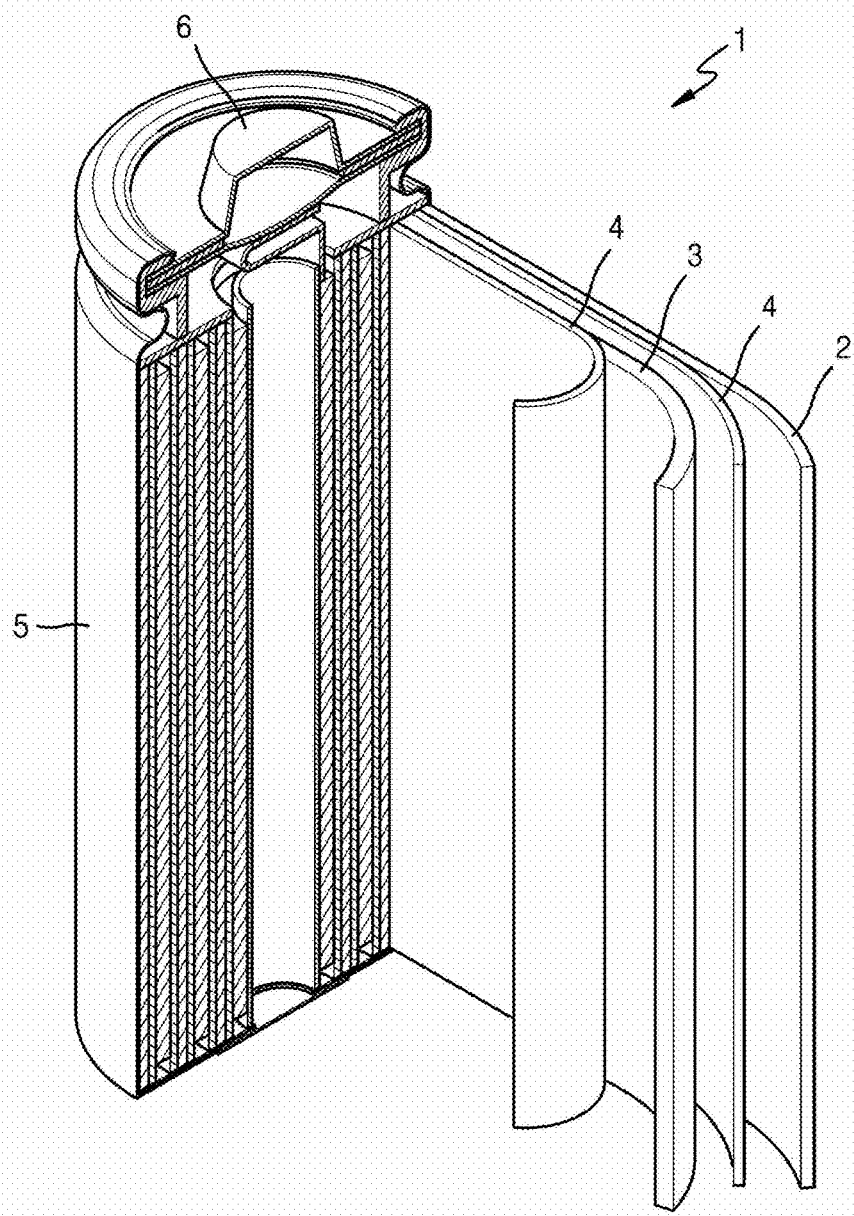
FIG. 7 is a schematic view of a lithium secondary battery according to an embodiment.

As shown in FIG. 7, an example lithium secondary battery 1 includes a positive electrode 3, a negative electrode 2, and a separator 4. The positive electrode 3, the negative electrode 2, and the separator 4 may be wound or folded and then received in a battery case 5. Next, an organic electrolytic solution is injected into the battery case 5 and a cap assembly 6 seals the battery case 5, thereby completing the lithium secondary battery 1. The battery case may have a cylindrical, a rectangular, or a thin-film format. For example, the lithium secondary battery may be a thin-film battery. The lithium secondary battery may be referred to as a lithium ion secondary battery.

The separator may be placed between the positive electrode and the negative electrode to form a battery structure. In some embodiments, the battery structure may be stacked in a bi-cell structure and impregnated in the organic electrolyte solution, and the resultant product may be put into a pouch and hermetically sealed, thereby completing manufacture of the lithium ion polymer battery.

In some embodiments, a plurality of battery structures may be stacked to form a series-connected battery pack, which may be utilized in any device that requires high capacity and high output. For example, the battery pack may be utilized in a laptop computer, a smart phone, and/or an electric vehicle.

The lithium secondary battery may have high-temperature cycle characteristics and/or high-temperature stability, and thus may be suitable for large energy storage devices. For example, the lithium secondary battery may be suitably utilized as a power source for an electric vehicle (EV). In some embodiments, the lithium secondary battery may also be suitably utilized as a power source for, for example, a hybrid vehicle (such as a plug-in hybrid electric vehicle (PHEV)).

Hereinafter, the present disclosure will be described in more detail with reference to the following examples, but these examples are not intended to limit the purpose and scope of the present disclosure.

Preparation Example 1: Preparation of One-Body NCA ($LiNi_{0.9}Co_{0.09}Al_{0.01}O_2$)

Particles $NiSO_4$ as a nickel precursor, $CoSO_4$ as a cobalt precursor, and $Al_2(SO_4)_3$ as an aluminum precursor were added to water in a mole ratio of 90:9:1 and mixed together to prepare an aqueous solution for forming a lithium nickel cobalt-based precursor. A sodium hydroxide aqueous solution was slowly dropwise added to the resultant mixture while stirring the aqueous solution, the reaction mixture was then stirred for 5 hours to react the precursor aqueous solution, and a nickel cobalt aluminum (NCA) hydroxide $Ni_{0.9}Co_{0.09}Al_{0.01}(OH)_2$ was precipitated. The resultant precipitate was filtered and then washed to obtain a resultant product, followed by drying in an air atmosphere at a temperature of 80° C., thereby preparing a $Ni_{0.9}Co_{0.09}Al_{0.01}(OH)_2$ powder having the form of small particles having an average particle diameter of about 4 μm.

The $Ni_{0.9}Co_{0.09}Al_{0.01}(OH)_2$ powder was thermally treated in an air atmosphere at a heat treatment temperature (T1) of 700° C. for 1 hour to obtain a nickel cobalt aluminum hydroxide as a lithium nickel cobalt-based active material precursor.

The NCA hydroxide and $Li_2CO_3$ as a lithium precursor were prepared to have a mole ratio of 1:1.05 of transition metal:Li. For example, the mixing mole ratio of the transition metals (sum of nickel, cobalt, and aluminum) and lithium was controlled or selected to be about 1:1.05.

The prepared precursors were mixed together in a mortar, and the mixture was put into a furnace, followed by performing a secondary heat treatment at a heat treatment temperature (T2) of 1040° C. for 10 hours with a stream of $O_2$, thereby preparing a positive electrode active material.

The positive electrode active material prepared by the above-described preparation method was NCA ($LiNi_{0.9}Co_{0.09}Al_{0.01}O_2$), and an average particle diameter of primary particles, which are one-body particles in the positive electrode active material, was about 4 μm.

The average particle diameter of primary particles in the positive electrode active material was measured utilizing a particle diameter analyzer (Beckman Coulter LS13 320).

Preparation Example 2: Preparation of One-Body NCM ($LiNi_{0.9}Co_{0.09}Mn_{0.01}O_2$) Particles One-body NCM ($LiNi_{0.9}Co_{0.09}Mn_{0.01}O_2$) particles were prepared in substantially the same manner as in Preparation Example 1, except that MnSO$_4$ as a manganese precursor, instead of Al$_2$(SO$_4$)$_3$ as an aluminum precursor, was utilized.

The positive electrode active material prepared by the above-described preparation method was NCM (LiNi$_{0.9}$Co$_{0.09}$Mn$_{0.01}$O$_2$), and an average particle diameter of primary particles, which are one-body particles in the positive electrode active material, was about 4 μm.

The average particle diameter of the primary particles in the positive electrode active material was measured utilizing a particle diameter analyzer (Beckman Coulter LS13 320).

Preparation Example 3: Preparation of One-Body NCA (LiNi$_{0.9}$Co$_{0.09}$Al$_{0.01}$O$_2$) Particles One-body NCA (LiNi$_{0.9}$Co$_{0.09}$Al$_{0.01}$O$_2$) particles were prepared in substantially the same manner as in Preparation Example 1, except that the heat treatment temperature (T1) was changed into 650° C. so as to obtain a positive electrode active material including primary particles having an average particle diameter of about 3 μm. The average particle diameter of the primary particles in the positive electrode active material was about 3 μm.

The average particle diameter of the primary particles in the positive electrode active material was measured utilizing a particle diameter analyzer [Beckman Coulter LS13 320].

Preparation Example 4: Preparation of One-Body NCA (LiNi$_{0.9}$Co$_{0.09}$Al$_{0.01}$O$_2$) Particles One-body NCA (LiNi$_{0.9}$Co$_{0.09}$Al$_{0.01}$O$_2$) particles having an average particle diameter (D50) of about 5 μm for primary particles in the positive electrode active material, were prepared in substantially the same manner as in Preparation Example 1, except that the heat treatment temperature (T1) was changed into 750° C. so as to obtain a positive electrode active material including primary particles having an average particle diameter of about 5 μm, and a mixing mole ratio of transition metals in the nickel cobalt aluminum oxide and lithium in the lithium precursor Li$_2$CO$_3$ was changed into 1:1.1, and the average particle diameter of primary particles in the prepared positive electrode active material was about 5 μm. The average particle diameter of primary particles in the positive electrode active material was measured utilizing a particle diameter analyzer [Beckman Coulter LS13 320].

Comparative Preparation Example 1: Preparation of Secondary Particle Type LiNi$_{0.9}$Co$_{0.09}$Mn$_{0.01}$O$_2$ (NCM)

Secondary particle type or kind LiNi$_{0.9}$Co$_{0.09}$Mn$_{0.01}$O$_2$ (NCM) having an average particle diameter (D50) of about 12 μm was prepared in substantially the same manner as in Preparation Example 2, except that the heat treatment temperature (T2) was changed into 900° C. so as to obtain secondary particle type or kind LiNi$_{0.9}$Co$_{0.09}$Mn$_{0.01}$O$_2$ (NCM) having an average particle diameter (D50) of about 12 μm, and a mixing mole ratio of the transition metals in the nickel cobalt manganese hydroxide and the lithium in the lithium precursor Li$_2$CO$_3$ was changed into 1:1.03.

Comparative Preparation Example 2: Preparation of Secondary Particle Type LiNi$_{0.9}$Co$_{0.09}$Al$_{0.01}$O$_2$ (NCA)

Secondary particle type or kind LiNi$_{0.9}$Co$_{0.09}$Al$_{0.01}$O$_2$ (NCA) having an average particle diameter (D50) of about 12 μm was prepared in substantially the same manner as in Comparative Preparation Example 1, except that an NCA precursor was utilized instead of an NCM precursor so as to obtain secondary particle type or kind LiNi$_{0.9}$Co$_{0.09}$Al$_{0.01}$O$_2$ (NCA).

Manufacture of Lithium Secondary Battery

Example 1

A positive electrode active material was prepared by mixing one-body LiCoO$_2$ particles (CM15V, Samsung SDI Co., Ltd.) having an average particle diameter of about 16 μm and the one-body LiNi$_{0.9}$Co$_{0.09}$Al$_{0.01}$O$_2$ particles having an average particle diameter (D50) of about 4 μm, prepared in Preparation Example 1, in a weight ratio of 7:3.

An active material slurry was prepared by adding Super P as a carbonaceous conducting agent and a polyvinylidene fluoride (PVDF) solution as a binder to the positive electrode active material and mixing together. In the prepared active material slurry, a mixing weight ratio of the active material, the conducting agent, and the binder was 98:1:1. The slurry was coated on a 12 μm thick Al current collector utilizing a thick-film coating device to have a loading level of 36 mg/cm$^2$, and the resultant product was dried at a temperature of 120° C. for about 1 hour or longer, followed by a press-rolling process to prepare a positive electrode. A press-rolling process was carried out using a rolling roll (e.g., roller) at 25° C., where the linear pressure of the rolling roll was controlled to about 2.3 tons, the gap between the upper and lower rolls constituting the rolling roll was adjusted to 0, and the positive electrode was pressed to the maximum after press-rolling. The thickness of the positive electrode was minimized and the mixture density of the positive electrode was high.

A negative electrode active material slurry was prepared by mixing, in a weight ratio of 98:2, graphite powder (Japan carbon) as a negative electrode active material, and a mixture of styrene butadiene rubber (SBR) and carboxymethyl cellulose (CMC) mixed in a weight ratio of 1:1.

The prepared negative electrode active material slurry was coated on a 8 μm thick copper foil current collector to an amount of 19.5 mg/cm$^2$. The coated electrode plate thus prepared was dried at a temperature of 100° C. for 1 hour or longer, followed by a press-rolling process to manufacture an negative electrode having a mixture density of 1.66 g/cm$^3$.

A lithium secondary battery having 2,000 mAh capacity was manufactured utilizing the positive electrode, the negative electrode, a polyethylene separator (STAR 20, Asahi), and an electrolyte solution including 1.15 M of LiPF$_6$ dissolved in a mixed solvent of EC (ethylene carbonate), EMC (ethylmethyl carbonate), and DMC (dimethyl carbonate) (volume ratio of 3:3:4).

Example 2

A lithium secondary battery was manufactured in substantially the same manner as in Example 1, except that, instead of the one-body LiNi$_{0.9}$Co$_{0.09}$Al$_{0.01}$O$_2$ (NCA) having an average particle diameter (D50) of about 4 μm, prepared in Preparation Example 1, one-body LiNi$_{0.9}$Co$_{0.09}$Mn$_{0.01}$O$_2$ (NCM) having an average particle diameter (D50) of about 4 μm, prepared in Preparation Example 2, was utilized.

Example 3

A lithium secondary battery was manufactured in substantially the same manner as in Example 1, except that a weight ratio of LiCoO$_2$ having an average particle diameter (D50) of about 16 μm (CM15V, Samsung SDI Co., Ltd.) and one-body LiNi$_{0.9}$Co$_{0.09}$Al$_{0.01}$O$_2$ having an average particle diameter (D50) of about 4 μm, prepared in Preparation Example 1, was changed into 6:4.

Example 4

A lithium secondary battery was manufactured in substantially the same manner as in Example 1, except that a weight ratio of LiCoO$_2$ having an average particle diameter (D50) of about 16 μm (CM15V, Samsung SDI Co., Ltd.) and one-body LiNi$_{0.9}$Co$_{0.09}$Al$_{0.01}$O$_2$ having an average particle diameter (D50) of about 4 μm, prepared in Preparation Example 1, was changed into 8:2.

Examples 5-8

Lithium secondary batteries were manufactured in substantially the same manner as in Example 1, except that LiCoO$_2$ and NCA each having average particle diameters shown in Table 1, were utilized.

TABLE 1

| Data | Average particle diameter (μm) of one-body LiCoO$_2$ particles | Average particle diameter (μm) of one-body NCA particles |
|---|---|---|
| Example 5 | 13 | 4 |
| Example 6 | 17 | 4 |
| Example 7 | 14 | 3 |
| Example 8 | 14 | 5 |

Comparative Example 1

A lithium secondary battery was manufactured in substantially the same manner as in Example 1, except that, instead of one-body LiNi$_{0.9}$Co$_{0.09}$Al$_{0.01}$O$_2$ particles having an average particle diameter (D50) of about 4 μm, prepared in Preparation Example 1, secondary particle type or kind LiNi$_{0.9}$Co$_{0.09}$Al$_{0.01}$O$_2$ having an average particle diameter (D50) of about 12 μm, prepared in Comparative Preparation Example 2, was utilized. The positive electrode active material utilized in Comparative Example 1 was thus a mixture of one-body LiCoO$_2$ particles having an average particle diameter (D50) of about 16 μm (CM15V, Samsung SDI Co., Ltd.) and secondary particle type or kind LiNi$_{0.9}$Co$_{0.09}$Al$_{0.01}$O$_2$ having an average particle diameter (D50) of about 12 μm, mixed in a weight ratio of 7:3.

Comparative Example 2

A lithium secondary battery was manufactured in substantially the same manner as in Example 1, except that one-body LiNi$_{0.9}$Co$_{0.09}$Al$_{0.01}$O$_2$ particles having an average particle diameter (D50) of about 4 μm, prepared in Preparation Example 1, was utilized alone as a positive electrode active material. A mixture density of a positive electrode was about 3.60 g/cc.

Comparative Example 3

A lithium secondary battery was manufactured in substantially the same manner as in Example 1, except that a weight ratio of one-body LiCoO$_2$ particles having an average particle diameter of about 16 μm (CM15V, Samsung SDI Co., Ltd.) and one-body LiNi$_{0.9}$Co$_{0.09}$Al$_{0.01}$O$_2$ particles having an average particle diameter (D50) of about 4 μm, prepared in Preparation Example 1, was changed into 3:7. A positive electrode active material utilized in Comparative Example 3 was a mixture of one-body LiCoO$_2$ particles having an average particle diameter of about 16 μm (CM15V, Samsung SDI Co., Ltd.) and one-body LiNi$_{0.9}$Co$_{0.09}$Al$_{0.01}$O$_2$ particles having an average particle diameter (D50) of about 4 μm, mixed in a weight ratio of 3:7.

Comparative Example 4

A lithium secondary battery was manufactured in substantially the same manner as in Example 1, except that one-body LiCoO$_2$ particles having an average particle diameter (D50) of about 16 μm was utilized alone as a positive electrode active material.

Comparative Example 5

A lithium secondary battery was manufactured in substantially the same manner as in Example 1, except that one-body LiNi$_{0.9}$Co$_{0.09}$Mn$_{0.01}$O$_2$ particles having an average particle diameter (D50) of about 4 μm, prepared in Preparation Example 2, was utilized alone as a positive electrode active material.

Comparative Example 6

A lithium secondary battery was manufactured in substantially the same manner as in Example 2, except that, instead of one-body LiNi$_{0.9}$Co$_{0.09}$Mn$_{0.01}$O$_2$ (NCM) particles having an average particle diameter (D50) of about 4 μm, prepared in Preparation Example 2, secondary particle type or kind LiNi$_{0.9}$Co$_{0.09}$Mn$_{0.01}$O$_2$ (NCM) having an average particle diameter (D50) of about 12 μm, prepared in Comparative Preparation Example 1, was utilized.

Evaluation Example 1: Mixture Density of Positive Electrode

The mixture densities of the positive electrodes prepared in Examples 1-4 and Comparative Examples 1-5 were investigated, and the results thereof are indicated in Table 2.

TABLE 2

| Data | mixture density (g/cc) |
|---|---|
| Example 1 | 4.19 |
| Example 2 | 4.13 |
| Example 3 | 4.10 |
| Example 4 | 4.17 |
| Comparative Example 1 | 4.09 |
| Comparative Example 2 | 3.60 |
| Comparative Example 3 | 3.85 |
| Comparative Example 4 | 4.19 |
| Comparative Example 5 | 3.60 |

Referring to Table 2, the positive electrode active materials of Examples 1 to 4 were found to have increased mixture densities, as compared with Comparative Example 3. Because the mixture densities were so increased, a capacity increasing effect can be obtained. The positive electrode active material of Comparative Example 4 has a good mixture density but many cracks are observed on LCO large particles, as indicated in Evaluation Example 3, which would result in increased side reactions with an electrolytic solution, deteriorated high-temperature storage characteristics, and reduced electrode plate flexibility.

The mixture densities of positive electrodes prepared in Examples 5-7 were investigated. The positive electrodes of Examples 5-7 had the same mixture density level as the positive electrode of Example 1.

Evaluation Example 2: Scanning Electron Microscope (SEM) Analysis

Figure 6A:
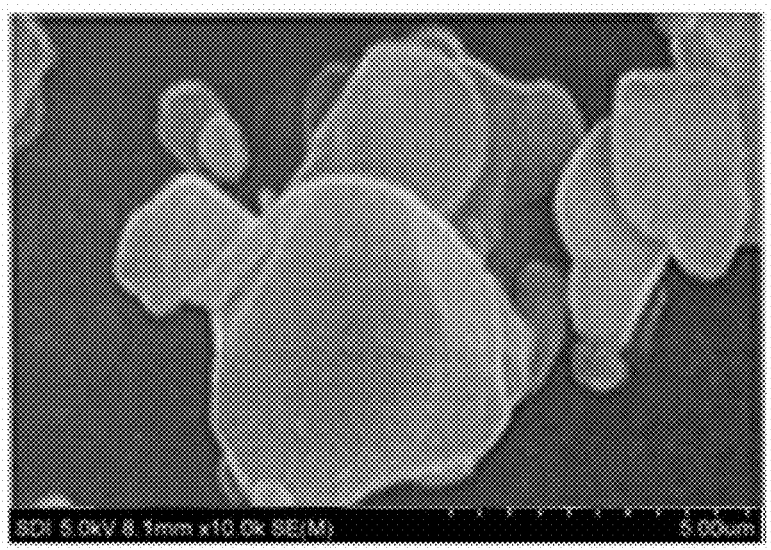
FIGS. 6A and 6B are SEM images showing a positive electrode active material prepared according to Preparation Example 1.
Figure 6B:
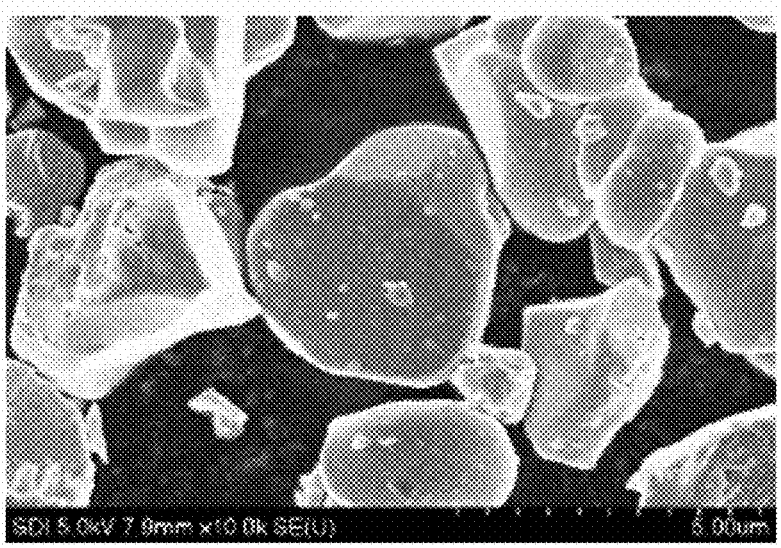

An SEM image of the positive electrode active material prepared in Preparation Example 1 was analyzed. A commercially available Sirion model SEM (FEI, USA) was used. The SEM analysis results are shown in FIGS. 6A and 6B. FIG. 6B is an enlarged SEM image view showing some regions of FIG. 6A.

Referring to FIGS. 6A and 6B, it was confirmed that the positive electrode active material prepared in Preparation Example 1 was a one-body active material including primary particles and having a substantially uniform particle size.

Evaluation Example 3: Thickness, Mixture Density, Adhesion, True Density and Porosity of Positive Electrode A thickness (d1) of the positive electrode prepared in Example 1 and Comparative Examples 1 to 4 was measured. Next, after each positive electrode active material was press-rolled, a press-rolled thickness (d2) of the positive electrode was measured.

The positive electrode was cut into a 30 mm×30 mm size, a thickness and weight thereof were measured to obtain a mixture density, and a positive electrode having substantially the same loading level was press-rolled to then calculate a compression ratio of the positive electrode according to equation 1 (e.g., the loading amounts of material were standardized across the Example and Comparative Example electrodes):

$$\text{Compression ratio (\%)} = \{(d1 - \text{current collector thickness}) - (d2 - \text{current collector thickness})\} / (d1 - \text{current collector thickness})$$ Equation 1

SEM images showing cross-sections of the positive electrodes prepared in Example 1 and Comparative Examples 1 to 4 are shown in FIGS. 1 to 5, respectively, illustrating test results of electrode crack formation (described below). A commercially available SEM with the model name of Sirion (FEI, US) was used.

A pressure of about 2.5 tons was applied to each of the active materials in the respective positive electrodes at 25° C., which were then subjected to press-rolling with a press roll gap between the upper and lower rolls being fixed to a minimum level (e.g., smallest gap setting, for example zero), and degrees of crushing for the active materials were quantified. The pressure was applied in a hydraulic manner, and a roll size was $\phi 500 \times 550$ mm (W).

The adhesion of each positive electrode was evaluated utilizing universal testing machine (UTM) equipment, and the porosity of each positive electrode was calculated according to Equation 2:

$$P = \{A - (B/T)\}/A \times 100\%$$ Equation 2 wherein, in Equation 2, P denotes a porosity of a positive electrode, A denotes an actual volume of the positive electrode active material layer of a positive electrode, B denotes a weight of an active material in a positive electrode, and T denotes a true density of a positive electrode active material in a positive electrode, except for a positive electrode current collector. As to the true density, see the description above and "Principles and applications of lithium secondary batteries" by Park, Jungki, the entire content of which is incorporated herein by reference.

The evaluation results of the above-referenced properties are indicated in Tables 3 and 4.

TABLE 3

| | | Thickness (μm) | | After pressing | | |
|---|---|---|---|---|---|---|
| Sample | Positive electrode active material | Thickness (d1) | Press-rolled thickness (d2) | Mixture density (g/cc) | Compression ratio (%) | Adhesion (gf/mm) |
| Example 1 | LCO: One-body NCA (7:3 in weight ratio) | 169 | 102 | 4.19 | 42.68 | 0.72 |
| Comparative Example 1 | LCO: Secondary particle NCA (7:3 in weight ratio) | 173 | 104 | 4.09 | 42.86 | 0.50 |
| Comparative Example 2 | One-body NCA | 197 | 118 | 3.60 | 42.70 | 0.20 |
| Comparative Example 3 | LCO: One-body NCA (3:7 in weight ratio) | 187 | 113 | 3.85 | 42.29 | 0.43 |
| Comparative Example 4 | LCO | 170 | 102 | 4.19 | 43.04 | 0.73 |

In Table 3, "After pressing" refers to a case in which the positive electrode was processed at a maximum pressure utilizing pressing equipment with a minimum roller gap. Here, the pressing refers to a press-rolling process of Example 1.

TABLE 4

| Data | Positive electrode active material | True density (g/cc) | Crack Test | Porosity (%) |
|---|---|---|---|---|
| Example 1 | LCO:One-body NCA (7:3 in weight ratio) | 4.96 | Good | 10.08 |
| Comparative Example 1 | LCO:Secondary particle NCA (7:3 in weight ratio) | 4.96 | Poor (pinholes) | 12.15 |
| Comparative Example 2 | One-body NCA | 4.76 | Poor (pinholes) | 19.43 |
| Comparative Example 3 | LCO:One-body NCA (3:7 in weight ratio) | 4.85 | Good | 15.67 |
| Comparative Example 4 | LCO | 5.10 | Good | 12.50 |

In Table 4, regarding the true density, reference is again made to "Principles and applications of lithium secondary batteries" by Park, Jungki.

Referring to Table 3, the positive electrode of Example 1 was found to have a smallest coating thickness (e.g., when the Examples and Comparative Examples are compared) at the same loading level. When the pressing of each electrode was performed with the same gap size, the compression ratio of the positive electrode of Example 1 was smaller than that of each of the positive electrodes of Comparative Examples 1 to 4. From this, it was confirmed that the positive electrode of Example 1 had improved electrode plate flexibility and increased mixture density, compared to each of the positive electrodes of Comparative Examples 1 to 4, and no cracks were observed in the active material after roll-pressing, as shown in FIG. 1.

As shown in Table 3, the positive electrode of Example 1 had the same mixture density of the positive electrode (utilizing only LCO) of Comparative Example 4, but, as shown in Table 4, the compression ratio of the positive electrode of Example 1 was smaller than that of the positive electrode of Comparative Example 4. By having a small compression ratio during press-rolling, the positive electrode of Example 1 showed a low level of stress applied to the electrode plate, no cracks were observed from the positive electrode active material by utilizing one-body NCA particles, as shown in FIG. 1, and the electrode plate had good quality when a high mixture density was achieved.

Figure 5:
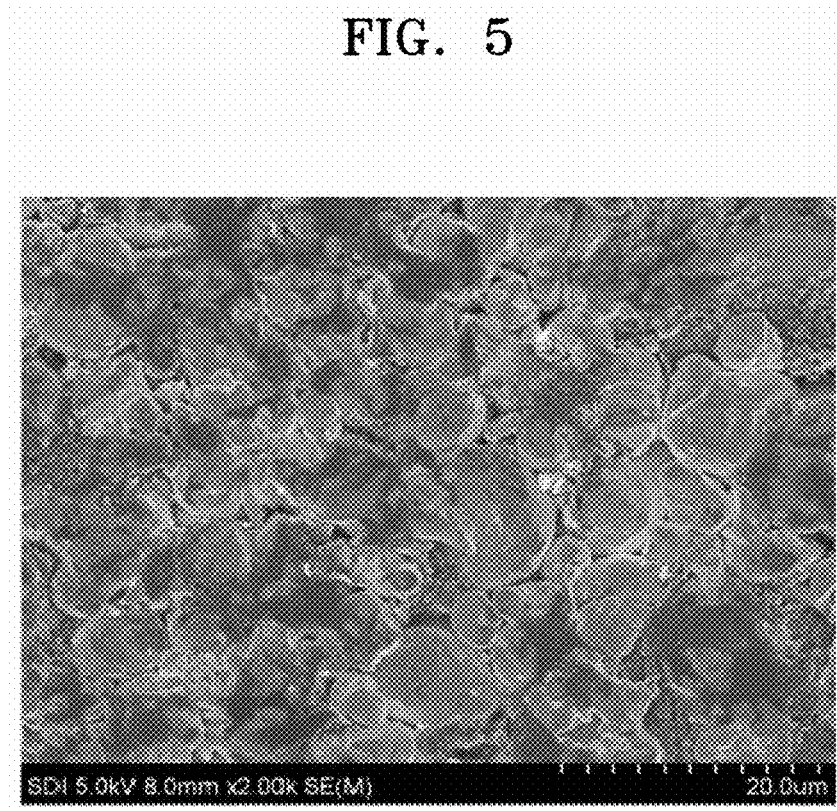

The positive electrode of Comparative Example 4 had many cracks (observed in the LCO large particles) after applying a pressure thereto, as shown in FIG. 5, due to an excessively or unsuitably high mixture density.

Figure 2:
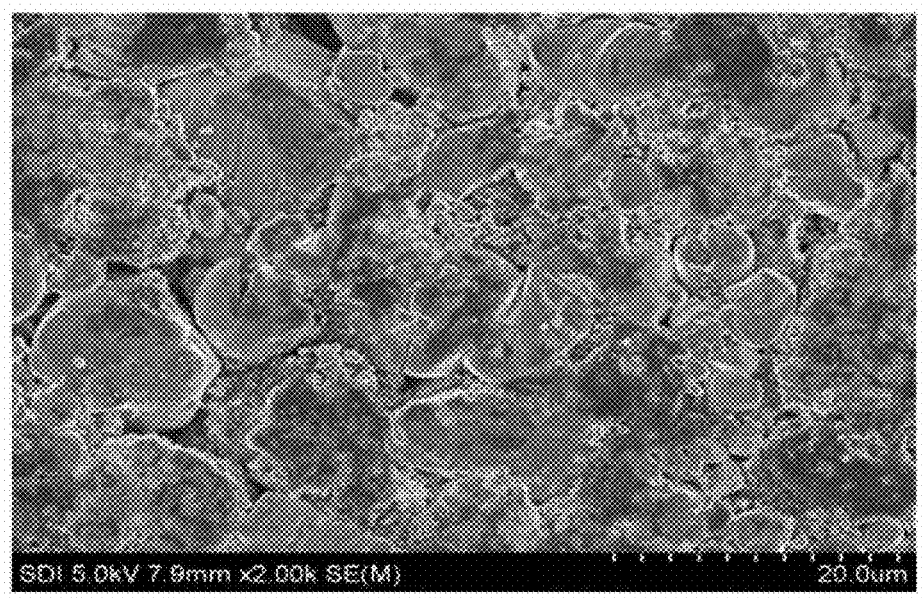
FIGS. 2-5 are SEM images showing press-rolled positive electrodes according to Comparative Examples 1-4.
Figure 3:
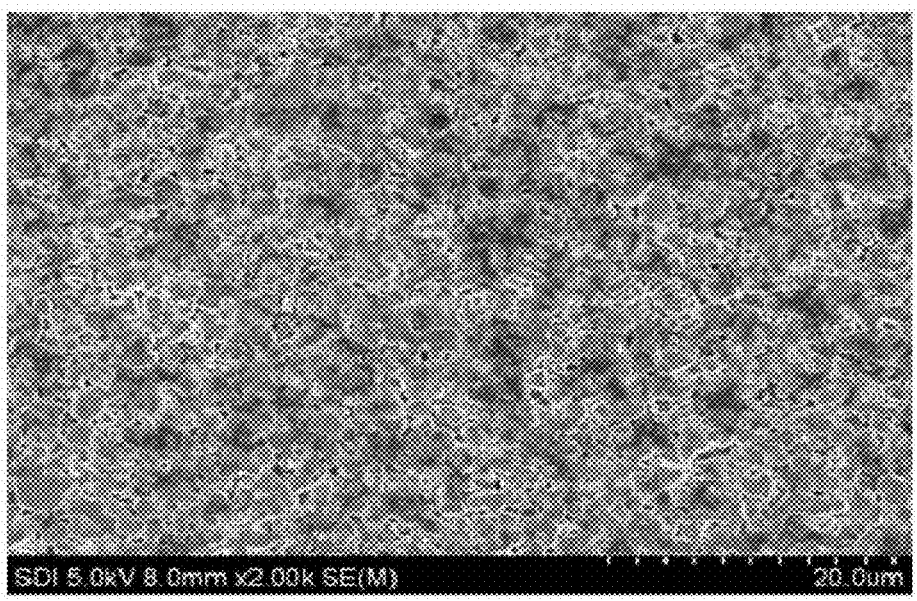
Figure 4:
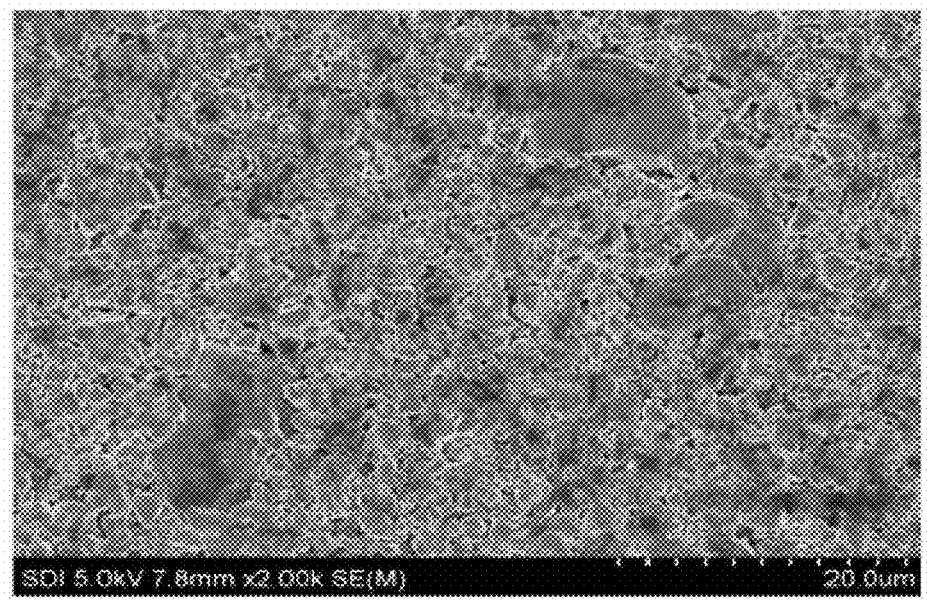

When a positive electrode was prepared utilizing secondary particle NCA according to Comparative Example 1, the compression ratio of the positive electrode was unfavorable, a larger number of cracks were observed from secondary particle type NCA (as shown in FIG. 2) compared to the positive electrode prepared according to Example 1, and the risk of gas generation was increased over repeated charge-discharge cycles. As shown in Table 3, the positive electrode of Comparative Example 1 showed unfavorable results in terms of mixture density and adhesion, compared to the positive electrode of Example 1.

The positive electrode of Comparative Example 3 had a higher proportion of one-body NCA particles than LCO in the positive electrode active material, and the positive electrode of Comparative Example 2, in which only one-body NCA particles were utilized as a positive electrode active material, was still unfavorable in terms of packing because of a relatively large coating thickness and a high compression ratio. Because the positive electrode of Comparative Example 2 had extremely low adhesion, a binder needs to be further added to blend (bind) an excess of one-body NCA particles, and, in such a case, cell resistance may be increased and the proportional amount of active material may be reduced, thereby undesirably leading to a reduction in capacity (e.g., specific capacity). The positive electrode of Comparative Example 2, in which only one-body NCA particles were utilized as a positive electrode active material, had pinholes generated during winding of the electrode plate.

Referring to Table 4, the positive electrode of Example 1 had a smaller porosity than each of the positive electrodes of Comparative Examples 1 to 3. Such a small porosity is advantageous in terms of contacts among particles in the active material, and thus a resistance decreasing effect may be exhibited. In addition, the positive electrode of Example 1 had no cracks, and thus had high-density and high-capacity characteristics.

However, the positive electrode of Comparative Example 1, which was not as densified compared to the positive electrode of Example 1, had a high electrode plate porosity, and defects (e.g., pinholes) were observed in the electrode plate due to excessive pressing. In the positive electrode of Comparative Example 1, the positive electrode active material is highly likely to be separated from the electrode plate during winding, and thus there is a high probability of occurrence of defects in the cell.

The positive electrode of Comparative Example 2 including a positive electrode active material including only small particles had low true density and mixture density, which is disadvantageous in terms of packing. In addition, the positive electrode of Comparative Example 2 had a relatively high porosity in the electrode plate, as shown in Table 4.

The positive electrode of Comparative Example 3, in which the positive electrode active material included (e.g., consisted of) a high proportion of small particles, had a lower true density and a higher porosity of the electrode plate than the positive electrode of Example 1. The positive electrode of Comparative Example 4, which included (e.g., consisted of) only LCO, had a high true density and a low porosity of an electrode plate thereof, but, as shown in FIG. 5, LCO large particles were severely cracked by being excessively pressed during press-rolling.

Evaluation Example 4: Discharge Capacity, Efficiency, Rate Characteristic, Room Temperature Cycle Life and High Temperature Cycle Life The lithium secondary batteries manufactured in Example 1 and Comparative Examples 1 and 3 were constant-current charged to a voltage of 4.35 V at a current of 0.5C at a temperature of 25° C., and then constant-voltage charged until the current reached 0.1 C while the potential was maintained at 4.35 V. Next, the lithium secondary batteries were constant-current discharged with a constant current of 0.7C until the voltage reached 2.75 V during discharging. (Formation Step)

Subsequently, the lithium secondary batteries were constant-current discharged at a current of 0.5C, and then constant-voltage charged until the current reached 0.1 C while the potential was maintained at the voltage of 4.35 V.

Next, the lithium secondary batteries were constant-current discharged with a constant current of 0.2C until the voltage reached 2.75 V during discharging (standard step).

The lithium secondary batteries having undergone the formation step and the standard step were each constant-current charged to a voltage of 4.35 V at a current of 0.7C at a temperature of 25° C., and then constant-voltage charged until the current reached 0.05C while the potential was maintained at 4.35 V. Next, the lithium secondary batteries were discharged with a constant current of 0.5C until the voltage reached 3.0 V during discharging, and this cycle of charging and discharging was repeated 300 times.

Additional charge-discharge tests were performed in substantially the same manner as in the charge-discharge tests performed at 25° C., except that the temperature was changed into 45° C. from 25° C., and the charging and discharging cycle was repeatedly performed 300 times in total. To evaluate rate characteristics, each of the lithium secondary batteries was constant-current charged to a voltage of 4.35 V at a current of 0.5C at a temperature of 25° C. and then constant-voltage charged until the current reached 0.05C while the potential was maintained at 4.35 V. The lithium secondary batteries were constant-current discharged with constant currents of 0.2C, 0.5C, 1.0C, and 2.0C until the voltage reached 3.0 V during discharging, and a discharge capacity measured when the c-rate was 2.0C with respect to a discharge capacity measured when the c-rate was 0.2C was calculated utilizing Equation 3. The rate characteristic results of the respective batteries are shown in Table 5:

Rate characteristic (%)=(discharge capacity at c-rate of 2.0C/discharge capacity at c-rate of 0.2C)× 100  Equation 3

Figure 8:
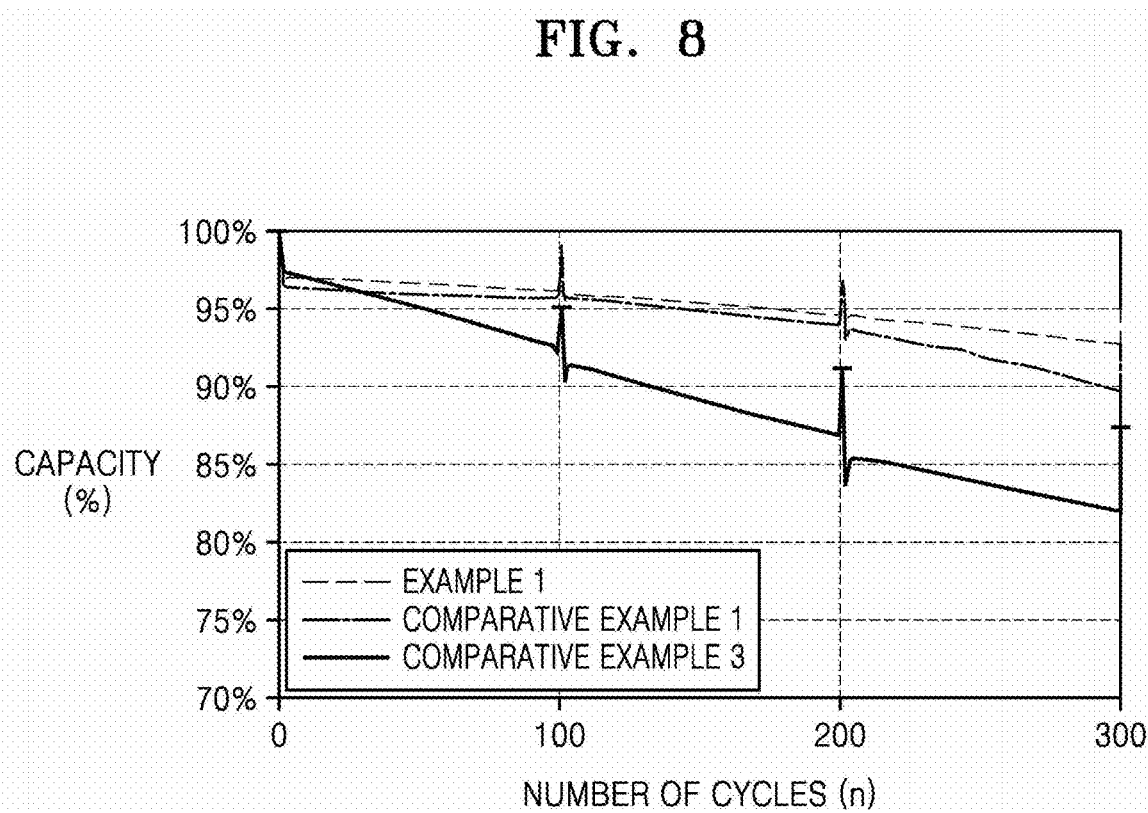
FIG. 8 is a graph showing changes in discharge capacity versus number of cycles of lithium secondary batteries manufactured in Example 1 and Comparative Examples 1-3.

Selected charge-discharge test results are shown in Table 5 and FIG. 8. A capacity retention of each battery is defined by Equation 4:

Capacity retention (%)=(discharge capacity at $300^{th}$ cycle/discharge capacity at first cycle)×100  Equation 4

TABLE 5

| Data | Discharge capacity (mAh/g) | Charge-discharge efficiency (%) | Rate characteristic (%) (2.0 C/ 0.2 C) | Capacity retention (%) at the $300^{th}$ cycle 25° C. | 45° C. |
|---|---|---|---|---|---|
| Example 1 | 184 | 91.3% | 91.9 | 92.6 | 89.0 |
| Comparative Example 1 | 182 | 89.6% | 90.6 | 89.6 | 84.7 |
| Comparative Example 3 | 194 | 88.1% | 88.7 | 81.9 | 77.7 |

As shown in Table 5 and FIG. 8, it was confirmed that the lithium secondary battery of Example 1 had improved charge-discharge efficiency, rate characteristic, room temperature cycle life, and high temperature cycle life, compared to the lithium secondary batteries of Comparative Examples 1 and 3.

The charge-discharge efficiencies, rate characteristics, room temperature cycle lives, and high temperature cycle lives of the lithium secondary batteries of Examples 2 to 7 were evaluated in the same manner as the method for evaluating the charge-discharge efficiency, rate characteristics, room temperature cycle life, and high temperature cycle life of the lithium secondary battery of Example 1 described above.

The charge-discharge efficiencies, rate characteristics, room temperature cycle lives, and high temperature cycle lives of the lithium secondary batteries of Examples 2 to 7 were evaluated to be substantially equivalent to those of the lithium secondary battery of Example 1.

According to an aspect, a positive electrode active material having an improved high-voltage characteristic is provided. A positive electrode for a lithium secondary battery having improved positive electrode slurry stability and/or electrode mixture density in preparing an electrode plate, may be manufactured by utilizing the positive electrode active material. In some embodiments, a lithium secondary battery having improved reliability and/or safety while suppressing gas generation at high voltages, may be manufactured by employing the positive electrode.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that the embodiments described herein should be considered in a descriptive sense only and not for purposes of limitation. Descriptions of features or aspects within each embodiment should typically be considered as being available for other similar features or aspects in other embodiments. While one or more embodiments have been described with reference to the drawings, it will be understood by those of ordinary skill in the art that various suitable changes in form and details may be made therein without departing from the spirit and scope of the disclosure, as defined by the following claims and equivalents thereof.

What is claimed is:

1. A positive electrode active material comprising:
a lithium cobalt-based active material; and
a lithium nickel cobalt-based active material, wherein:
the lithium cobalt-based active material is larger in size and amount than the lithium nickel cobalt-based active material, and
the lithium nickel cobalt-based active material is a one-body active material primarily composed of one-body particles each being produced by increasing a size of a primary particle and each of the one-body particles being present in independent phase without being morphologically agglomerated with other one-body particles,
the lithium cobalt-based active material is a one-body active material primarily composed of one-body particles each being produced by increasing a size of a primary particle and each of the one-body particle being present in independent phase without being morphologically agglomerated with other one-body particles, and
the lithium nickel cobalt-based active material is a compound represented by Formula 8:

$$Li_xCO_aNi_bAl_cO_2 \qquad \text{Formula 8}$$

wherein, in Formula 8, $0.9<x<1.2$, $0<a\leq0.09$, $0.6\leq b<1$, $0<c\leq0.01$, and $a+b+c=1$.

2. The positive electrode active material of claim 1, wherein:
an average particle diameter of the lithium cobalt-based active material is 10 μm to 20 μm, and
an average particle diameter of the lithium nickel cobalt-based active material is 3 μm to 8 μm.

3. The positive electrode active material of claim 1, wherein the lithium cobalt-based active material is a compound represented by Formula 1, a compound represented by Formula 2, or a combination thereof:

$$Li_xCo_{1-y}M_yA_2 \qquad \text{Formula 1}$$

wherein, in Formula 1, $0.9\leq x\leq 1.2$, and $0\leq y\leq 0.5$,
M is Mn, Mg, Ca, Sr, Ba, Ti, Zr, Nb, Mo, W, Zn, Al, Si, Cr, Fe, V, a rare earth element, or a combination thereof, and
A is O, F, S, P, or a combination thereof, and $$Li_xCo_{1-y}M_yO_{2-z}X_z \qquad \text{Formula 2}$$

wherein, in Formula 2, $0.9\leq x\leq 1.2$, $0\leq y\leq 0.5$, and $0\leq z\leq 0.5$,
M is Mn, Mg, Ca, Sr, Ba, Ti, Zr, Nb, Mo, W, Zn, Al, Si, Cr, Fe, V, a rare earth element, or a combination thereof, and
X is F, S, P, or a combination thereof.

4. The positive electrode active material of claim 1, wherein the lithium cobalt-based active material is a compound represented by Formula 5:

$$Li_xCO_aO_{2+\alpha} \qquad \text{Formula 5}$$

wherein, in Formula 5, $0.9\leq x\leq 1.2$, $0.98\leq a\leq 1.00$, and $-0.1\leq\alpha\leq 0.1$.

5. The positive electrode active material of claim 1, wherein:
the lithium cobalt-based active material is $LiCoO_2$, and
the lithium nickel cobalt-based active material is the compound represented by Formula 8, and the compound represented by Formula 8 is $LiNi_{0.9}Co_{0.09}Al_{0.01}O_2$, $Li_{1.05}Ni_{0.9}Co_{0.09}Al_{0.01}O_2$, or a combination thereof.

6. A positive electrode comprising a positive electrode active material including:
a lithium cobalt-based active material; and
a lithium nickel cobalt-based active material, wherein:
the lithium cobalt-based active material is larger in size and amount than the lithium nickel cobalt-based active material, and
the lithium nickel cobalt-based active material is a one-body active material primarily composed of one-body particles each being produced by increasing a size of a primary particle and each of the one-body particle being present in independent phase without being morphologically agglomerated with other one-body particles,
the lithium nickel cobalt-based active material is a compound represented by Formula 8:

$$Li_xCO_aNi_bAl_cO_2 \qquad \text{Formula 8}$$

wherein, in Formula 8, $0.9<x<1.2$, $0<a\leq 0.09$, $0.6\leq b<1$, $0<c\leq 0.01$, and $a+b+c=1$.

7. The positive electrode of claim 6, wherein the positive electrode has a mixture density of 4.1 g/cc or greater.

8. The positive electrode of claim 6, wherein an average particle diameter of the lithium cobalt-based active material is 10 μm to 20 μm, and
an average particle diameter of the lithium nickel cobalt-based active material is 3 μm to 8 μm.

9. The positive electrode of claim 6, wherein the lithium cobalt-based active material is a one-body active material.

10. The positive electrode of claim 6, wherein the lithium cobalt-based active material is a compound represented by Formula 1, a compound represented by Formula 2, or a combination thereof:

$$Li_xCo_{1-y}M_yA_2 \qquad \text{Formula 1}$$

wherein, in Formula 1, $0.9\leq x\leq 1.2$, and $0\leq y\leq 0.5$,
M is Mn, Mg, Ca, Sr, Ba, Ti, Zr, Nb, Mo, W, Zn, Al, Si, Cr, Fe, V, a rare earth element, or a combination thereof, and
A is O, F, S, P, or a combination thereof, and $$Li_xCo_{1-y}M_yO_{2-z}X_z \qquad \text{Formula 2}$$

wherein, in Formula 2, $0.9\leq x\leq 1.2$, $0\leq y\leq 0.5$, and $0\leq z\leq 0.5$,
M is Mn, Mg, Ca, Sr, Ba, Ti, Zr, Nb, Mo, W, Zn, Al, Si, Cr, Fe, V, a rare earth element, or a combination thereof, and
X is F, S, P, or a combination thereof.

11. The positive electrode of claim 6, wherein the lithium cobalt-based active material is a compound represented by Formula 5:

$$Li_xCO_aO_{2+\alpha} \qquad \text{Formula 5}$$

wherein, in Formula 5, $0.9\leq x\leq 1.2$, $0.98\leq a\leq 1.00$, and $-0.1\leq\alpha\leq 0.1$.

12. The positive electrode of claim 6, wherein:
the lithium cobalt-based active material is $LiCoO_2$, and
the lithium nickel cobalt-based active material is $LiNi_{0.9}Co_{0.09}Al_{0.01}O_2$, $Li_{1.05}Ni_{0.9}Co_{0.09}Al_{0.01}O_2$, or a combination thereof.

13. A lithium secondary battery comprising:
the positive electrode of claim 6,
a negative electrode, and
an electrolyte therebetween.

14. A positive electrode comprising a positive electrode active material including:
a lithium cobalt-based active material; and
a lithium nickel cobalt-based active material,
wherein:
the lithium cobalt-based active material is larger in size and amount than the lithium nickel cobalt-based active material, the lithium nickel cobalt-based active material is a one-body active material, and the positive electrode has a mixture density of 4.1 g/cc or greater.

15. A positive electrode active material comprising:
a lithium cobalt-based active material; and
a lithium nickel cobalt-based active material,
wherein:
the lithium cobalt-based active material is larger in size and amount than the lithium nickel cobalt-based active material, and the lithium nickel cobalt-based active material is a one-body active material comprising one-body particles each being produced by increasing a size of a primary particle and each of the one-body particle being present in independent phase without being morphologically agglomerated with other one-body particles, the lithium cobalt-based active material is a one-body active material comprising one-body particles each being produced by increasing a size of a primary particle and each of the one-body particle being present in independent phase without being morphologically agglomerated with other one-body particles, and the lithium nickel cobalt-based active material is $LiNi_{0.9}Co_{0.09}Mn_{0.01}O_2$, $Li_{1.05}Ni_{0.9}Co_{0.09}Mn_{0.01}O_2$, or a combination thereof.

* * * * *

UNITED STATES PATENT AND TRADEMARK OFFICE
CERTIFICATE OF CORRECTION

| | | |
|---|---|---|
| PATENT NO. | : 12,159,996 B2 | Page 1 of 1 |
| APPLICATION NO. | : 17/211650 | |
| DATED | : December 3, 2024 | |
| INVENTOR(S) | : Mihwa Yang et al. | |

It is certified that error appears in the above-identified patent and that said Letters Patent is hereby corrected as shown below:

In the Claims

In Column 27, Line 21, in Claim 1, Formula 8, delete "$Li_xCO_aNi_bAl_cO_2$" and insert -- $Li_xCo_aNi_bAl_cO_2$ --.

In Column 27, Line 52, in Claim 4, Formula 5, delete "$Li_xCO_aO_{2+\alpha}$" and insert -- $Li_xCo_aO_{2+\alpha}$ --.

In Column 28, Line 14, in Claim 6, Formula 8, delete "$Li_xCO_aNi_bAl_cO_2$" and insert -- $Li_xCo_aNi_bAl_cO_2$ --.

In Column 28, Line 48, in Claim 11, Formula 5, delete "$Li_xCO_aO_{2+\alpha}$" and insert -- $Li_xCo_aO_{2+\alpha}$ --.

Signed and Sealed this
Fifteenth Day of April, 2025

Coke Morgan Stewart
*Acting Director of the United States Patent and Trademark Office*